United States Patent
Matsui et al.

(10) Patent No.: US 12,099,033 B2
(45) Date of Patent: Sep. 24, 2024

(54) MECHANICAL PROPERTY MEASURING APPARATUS, MECHANICAL PROPERTY MEASURING METHOD, SUBSTANCE MANUFACTURING EQUIPMENT, SUBSTANCE MANAGEMENT METHOD, AND SUBSTANCE MANUFACTURING METHOD

(71) Applicant: JFE STEEL CORPORATION, Tokyo (JP)

(72) Inventors: Yutaka Matsui, Tokyo (JP); Takafumi Ozeki, Tokyo (JP); Kazuki Terada, Tokyo (JP); Kenji Adachi, Tokyo (JP); Hiroki Imanaka, Tokyo (JP); Daichi Izumi, Tokyo (JP); Junji Shimamura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 167 days.

(21) Appl. No.: 18/001,472

(22) PCT Filed: Jun. 14, 2021

(86) PCT No.: PCT/JP2021/022594
§ 371 (c)(1),
(2) Date: Dec. 12, 2022

(87) PCT Pub. No.: WO2021/256443
PCT Pub. Date: Dec. 23, 2021

(65) Prior Publication Data
US 2023/0228713 A1 Jul. 20, 2023

(30) Foreign Application Priority Data
Jun. 15, 2020 (JP) .................. 2020-103336

(51) Int. Cl.
*G01N 27/80* (2006.01)
*B21C 51/00* (2006.01)

(52) U.S. Cl.
CPC .............. *G01N 27/80* (2013.01); *B21C 51/00* (2013.01)

(58) Field of Classification Search
CPC ......... G01N 27/80; G01N 27/82; B21C 51/00
See application file for complete search history.

(56) References Cited

U.S. PATENT DOCUMENTS

| 5,679,887 A | 10/1997 | Salmasi et al. |
| 10,885,684 B2 | 1/2021 | Motohashi |

(Continued)

FOREIGN PATENT DOCUMENTS

| EP | 4166251 A1 | 4/2023 |
| JP | H09113488 A | 5/1997 |

(Continued)

OTHER PUBLICATIONS

Nov. 6, 2023, the Extended European Search Report issued by the European Patent Office in the corresponding European Patent Application No. 21825295.5.

(Continued)

*Primary Examiner* — Giovanni Astacio-Oquendo
*Assistant Examiner* — Zannatul Ferdous
(74) *Attorney, Agent, or Firm* — KENJA IP LAW PC

(57) ABSTRACT

Provided are: a mechanical property measuring apparatus and method that can accurately measure a mechanical property through physical quantities; a substance manufacturing equipment and method that can improve the production yield rate and high-quality substance. A mechanical property measuring apparatus (100) comprises: a physical quantity measuring unit (5) configured to measure a plurality of physical quantities of a measured object that includes a substance and a film on a surface of the substance; a mechanical property calculating unit (82) configured to calculate, using a plurality of calculation models each for calculating a mechanical property of the substance and at least two of the plurality of physical quantities measured, the mechanical property of the substance for each of the plu- (Continued)

rality of calculation models; and a selection processing unit (81) configured to select one mechanical property based on the at least two of the plurality of physical quantities.

7 Claims, 14 Drawing Sheets

(56) References Cited

U.S. PATENT DOCUMENTS

| | | |
|---|---|---|
| 11,193,910 B2 | 12/2021 | Suzuma et al. |
| 2017/0108469 A1 | 4/2017 | Timmons et al. |
| 2018/0221929 A1* | 8/2018 | Chang .................... B21C 51/00 |
| 2018/0260717 A1 | 9/2018 | Li et al. |
| 2020/0024712 A1 | 1/2020 | Iwamura |
| 2020/0050954 A1 | 2/2020 | Fukushima et al. |
| 2022/0181180 A1 | 6/2022 | Fujikata et al. |
| 2023/0228712 A1* | 7/2023 | Ozeki .................... G01N 27/80 |
| | | 324/238 |
| 2023/0251226 A1* | 8/2023 | Matsui ................. G01N 27/902 |
| | | 324/228 |

FOREIGN PATENT DOCUMENTS

| | | |
|---|---|---|
| JP | 2008224495 A | 9/2008 |
| JP | 2018169994 A | 11/2018 |
| JP | 2018178157 A | 11/2018 |
| JP | 2019042807 A | 3/2019 |
| JP | 2019158474 A | 9/2019 |
| JP | 2019207123 A | 12/2019 |
| JP | 2020027432 A | 2/2020 |
| RU | 2424509 C1 | 7/2011 |
| SU | 1644018 A1 | 4/1991 |
| WO | 2016063433 A1 | 4/2016 |
| WO | 2018062398 A1 | 4/2018 |
| WO | 2019087460 A1 | 5/2019 |

OTHER PUBLICATIONS

Hu Pengfei et al., A New Method of Eddy Current Impedance-Extracting and Hardness-Classifying for Valves, IEEE Access, Feb. 2020, pp. 46781-46794, vol. 8, XP011778352.

L. Udpa et al., Eddy Current Defect Characterization Using Neural Networks, Materials Evaluation, Mar. 1990, pp. 342-347, vol. 48, XP000560189.

Aug. 24, 2021, International Search Report issued in the International Patent Application No. PCT/JP2021/022594.

Mar. 15, 2022, Notification of Reasons for Refusal issued by the Japan Patent Office in the corresponding Japanese Patent Application No. 2021-554398 with English language Concise Statement of Relevance.

Jun. 13, 2023, Office Action issued by the Federal Service for Intellectual Property, Patents and Trademarks of the Russian Federation in the corresponding Russian Patent Application No. 2023100528 with English language search report.

* cited by examiner

| ID | H_max | H_ave | X_max | Y_max | X_c | Y_c | X_L | X_R | Y_T | Y_B |
|----|-------|-------|-------|-------|-----|-----|-----|-----|-----|-----|
| 1  |       |       |       |       |     |     |     |     |     |     |
| 2  |       |       |       |       |     |     |     |     |     |     |
| 3  |       |       |       |       |     |     |     |     |     |     |
| 4  |       |       |       |       |     |     |     |     |     |     |
| 5  |       |       |       |       |     |     |     |     |     |     |
| ...|       |       |       |       |     |     |     |     |     |     |

MECHANICAL PROPERTY MEASURING APPARATUS, MECHANICAL PROPERTY MEASURING METHOD, SUBSTANCE MANUFACTURING EQUIPMENT, SUBSTANCE MANAGEMENT METHOD, AND SUBSTANCE MANUFACTURING METHOD

TECHNICAL FIELD

The present disclosure relates to a mechanical property measuring apparatus, a mechanical property measuring method, a substance manufacturing equipment, a substance management method, and a substance manufacturing method.

BACKGROUND

In the production of a steel material used as raw material of line pipes and the like, a sampling inspection is sometimes conducted as an inspection of the mechanical property of the steel material. The sampling inspection is a destructive test in which a part to be inspected is taken out from the steel material, worked into a mechanical test piece, and tested. In recent years, there has been a demand to, instead of sampling inspections, non-destructively measure or evaluate the mechanical property of a steel material product itself and assure the quality. Attempts have thus been made to measure the mechanical property of a steel material through various physical quantities relating to the mechanical property of the steel material and measured during or after the production of the steel material.

For example, JP 2008-224495 A (PTL 1) describes a technique of applying an alternating magnetic field to a metal material and detecting induced eddy current to detect a high hardness portion locally present in the metal material.

For example, WO 2019/087460 A1 (PTL 2) describes a detection device including a yoke member that has a first opening into which a long material is inserted on one side in the longitudinal direction of the long material and a second opening into which the long material is inserted on the other side in the longitudinal direction of the long material and that has a shape approximately symmetrical about an axis passing through the first opening and the second opening. The detection device in PTL 2 can reduce dead zones at the longitudinal ends of the long material, and accurately detect changes in magnetic property.

For example, JP H9-113488 A (PTL 3) describes a technique of evaluating the thickness of a coating material of an object under examination from the intensity of eddy current induced in the object and determining the degree of degradation of the object from information about the thickness reduction of the coating material.

CITATION LIST

Patent Literature

PTL 1: JP 2008-224495 A
PTL 2: WO 2019/087460 A1
PTL 3: JP H9-113488 A

SUMMARY

Technical Problem

In the case of measuring electromagnetic feature values of a steel material surface layer by a sensor to measure a mechanical property, accurate calculation is difficult with the conventional techniques because the relationship between the electromagnetic feature values and the mechanical property varies greatly. For example, steel materials manufactured to have the same mechanical property may differ in the electromagnetic feature values of the steel material surface layer measured by the sensor. There is thus a need for a technique that is usable in a steel material production process and enables accurate measurement of a mechanical property in a non-destructive manner.

It could therefore be helpful to provide a mechanical property measuring apparatus and a mechanical property measuring method that can accurately measure a mechanical property through physical quantities. It could also be helpful to provide a substance manufacturing equipment and a substance manufacturing method that can improve the production yield rate of a substance by enabling accurate measurement of a mechanical property through physical quantities. It could also be helpful to provide a substance management method that can provide a high-quality substance by enabling accurate measurement of a mechanical property through physical quantities.

Solution to Problem

We studied the relationship between the physical quantities and the mechanical property of a measured object (i.e. an object to be measured), and discovered that the relationship is influenced by the property of a film of the measured object.

A mechanical property measuring apparatus according to one embodiment of the present disclosure comprises: a physical quantity measuring unit configured to measure a plurality of physical quantities of a measured object that includes a substance and a film on a surface of the substance; a mechanical property calculating unit configured to calculate, using a plurality of calculation models each for calculating a mechanical property of the substance and at least two of the plurality of physical quantities measured, the mechanical property of the substance for each of the plurality of calculation models; and a selection processing unit configured to select, as the mechanical property of the substance, one mechanical property out of a plurality of mechanical properties of the substance calculated, based on the at least two of the plurality of physical quantities.

A mechanical property measuring method according to one embodiment of the present disclosure comprises: a measuring step of measuring a plurality of physical quantities of a measured object that includes a substance and a film on a surface of the substance; a calculating step of calculating, using a plurality of calculation models each for calculating a mechanical property of the substance and at least two of the plurality of physical quantities measured, the mechanical property of the substance for each of the plurality of calculation models; and a selecting step of selecting, as the mechanical property of the substance, one mechanical property out of a plurality of mechanical properties of the substance calculated, based on the at least two of the plurality of physical quantities.

A substance manufacturing equipment according to one embodiment of the present disclosure comprises: a manufacturing equipment configured to manufacture a substance; and a mechanical property measuring apparatus, wherein the mechanical property measuring apparatus includes: a physical quantity measuring unit configured to measure a plurality of physical quantities of a measured object that includes the substance and a film on a surface of the substance; a mechanical property calculating unit configured to calculate, using a plurality of calculation models each for calculating a mechanical property of the substance and at least two of the plurality of physical quantities measured, the mechanical property of the substance for each of the plurality of calculation models; and a selection processing unit configured to select, as the mechanical property of the substance, one mechanical property out of a plurality of mechanical properties of the substance calculated, based on the at least two of the plurality of physical quantities, and the mechanical property measuring apparatus is configured to measure the mechanical property of the substance manufactured by the manufacturing equipment.

A substance management method according to one embodiment of the present disclosure comprises: a measuring step of measuring a plurality of physical quantities of a measured object that includes a substance and a film on a surface of the substance; a calculating step of calculating, using a plurality of calculation models each for calculating a mechanical property of the substance and at least two of the plurality of physical quantities measured, the mechanical property of the substance for each of the plurality of calculation models; a selecting step of selecting, as the mechanical property of the substance, one mechanical property out of a plurality of mechanical properties of the substance calculated, based on the at least two of the plurality of physical quantities; and a management step of classifying the substance based on the selected mechanical property of the substance.

A substance manufacturing method according to one embodiment of the present disclosure comprises: a manufacturing step of manufacturing a substance; a measuring step of measuring a plurality of physical quantities of a measured object that includes the substance manufactured and a film on a surface of the substance; a calculating step of calculating, using a plurality of calculation models each for calculating a mechanical property of the substance and at least two of the plurality of physical quantities measured, the mechanical property of the substance for each of the plurality of calculation models; and a selecting step of selecting, as the mechanical property of the substance, one mechanical property out of a plurality of mechanical properties of the substance calculated, based on the at least two of the plurality of physical quantities.

Advantageous Effect

It is thus possible to provide a mechanical property measuring apparatus and a mechanical property measuring method that can accurately measure a mechanical property through physical quantities. It is also possible to provide a substance manufacturing equipment and a substance manufacturing method that can improve the production yield rate of a substance by enabling accurate measurement of a mechanical property through physical quantities. It is also possible to provide a substance management method that can provide a high-quality substance by enabling accurate measurement of a mechanical property through physical quantities.

DETAILED DESCRIPTION

Embodiment 1

Figure 1:
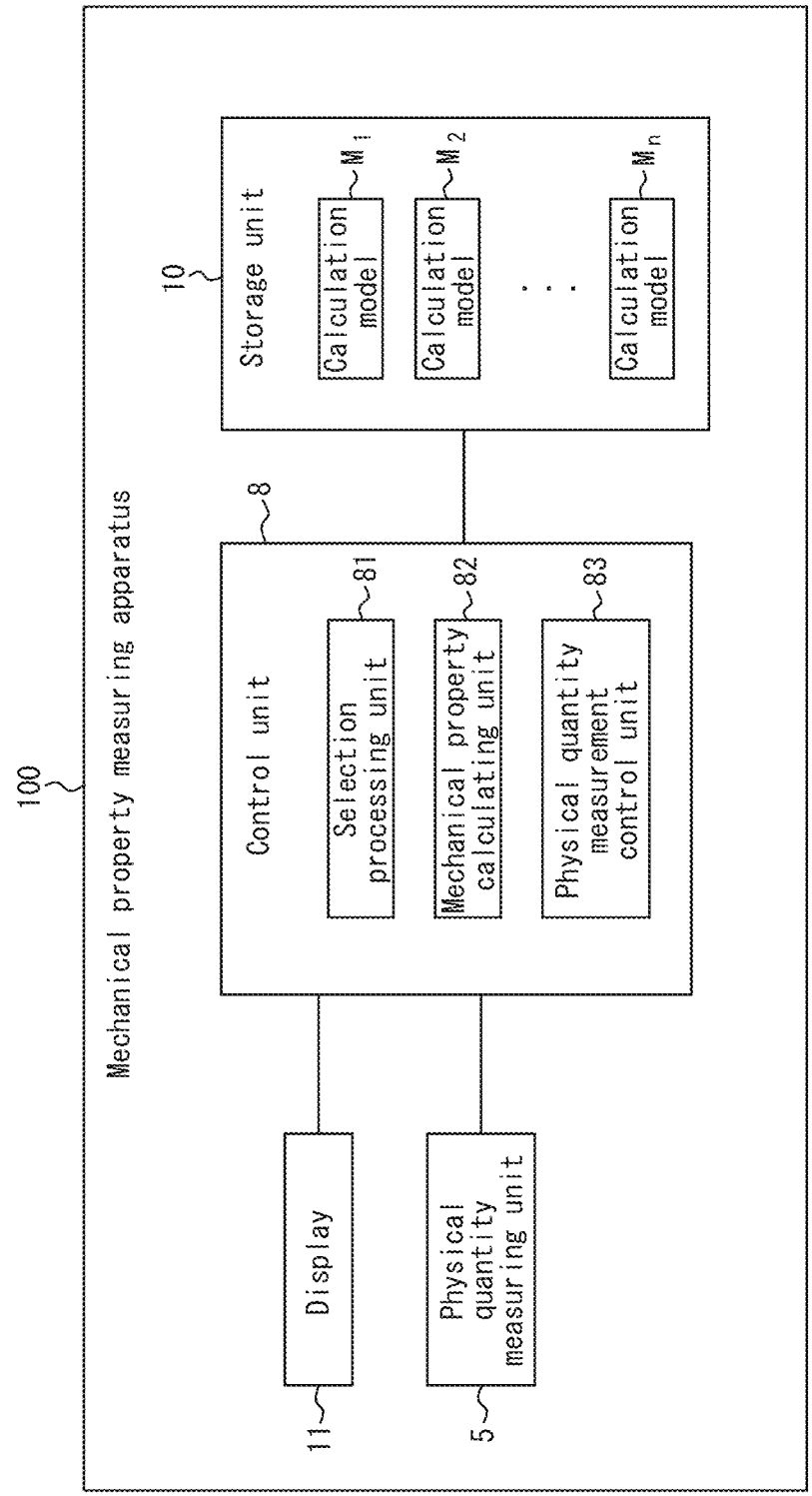
FIG. 1 is a block diagram of a mechanical property measuring apparatus according to one embodiment of the present disclosure.

FIG. 1 is a block diagram of a mechanical property measuring apparatus 100 according to Embodiment 1 of the present disclosure. The measuring apparatus 100 non-destructively measures a mechanical property (or mechanical properties, the same applies hereafter) of a substance 1 in a measured object 101 (see FIG. 2) through a plurality of physical quantities of the measured object 101 measured by a physical quantity measuring unit 5. The mechanical property herein is a dynamic property, and in particular a property against an external force such as tension, compression, or shear. Examples of the mechanical property include strength such as tensile stress, yield stress, and compressive stress, hardness such as Vickers hardness and Leeb hardness, and brittleness. The physical quantities are objectively measurable quantities. Examples of the physical quantities include temperatures, masses, and electromagnetic feature values.

Although this embodiment describes an example in which the substance 1 is a steel material, the substance 1 is not limited to a steel material. Although this embodiment describes an example in which the mechanical property is hardness, the mechanical property is not limited to hardness. Although this embodiment describes an example in which the plurality of physical quantities are electromagnetic feature values including current waveform distortion amount, current waveform amplitude, harmonic amplitude, magnetic permeability, and coercive force, the plurality of physical quantities are not limited to electromagnetic feature values.

It is conventionally known that electromagnetic feature values such as magnetic permeability and coercive force correlate with the mechanical property of metal. Hence, it is preferable to measure or evaluate the mechanical property using electromagnetic feature values. A preferable method of measuring electromagnetic feature values is, for example, eddy current examination or micromagnetic multiparameter microstructure and stress analysis (3MA). In particular, it is preferable to use an AC signal (alternating current or alternating voltage) obtained by superimposing two or more frequencies as a signal to be applied to generate an alternating magnetic field, because more electromagnetic feature values can be acquired. It is more preferable to set one of the frequencies to 200 Hz or less, because, even in the case where a film 2 (see FIG. 2) is formed on the surface of the substance 1, the alternating magnetic field sufficiently penetrates to the surface of the substance 1 and the mechanical property can be measured or evaluated more accurately. The foregoing measurement method is particularly preferable in the case of measuring the electromagnetic feature values of the surface layer of the substance 1.

(Structure of Mechanical Property Measuring Apparatus)

As illustrated in FIG. 1, the measuring apparatus 100 includes the physical quantity measuring unit 5, a control unit 8, a storage unit 10, and a display 11. The control unit 8 includes a selection processing unit 81, a mechanical property calculating unit 82, and a physical quantity measurement control unit 83. The storage unit 10 includes a plurality of calculation models $M_1$, $M_2$, . . . , $M_n$ for calculating the mechanical property of the substance 1, where n is an integer of 2 or more. The details of each component in the measuring apparatus 100 will be described later.

Figure 2:
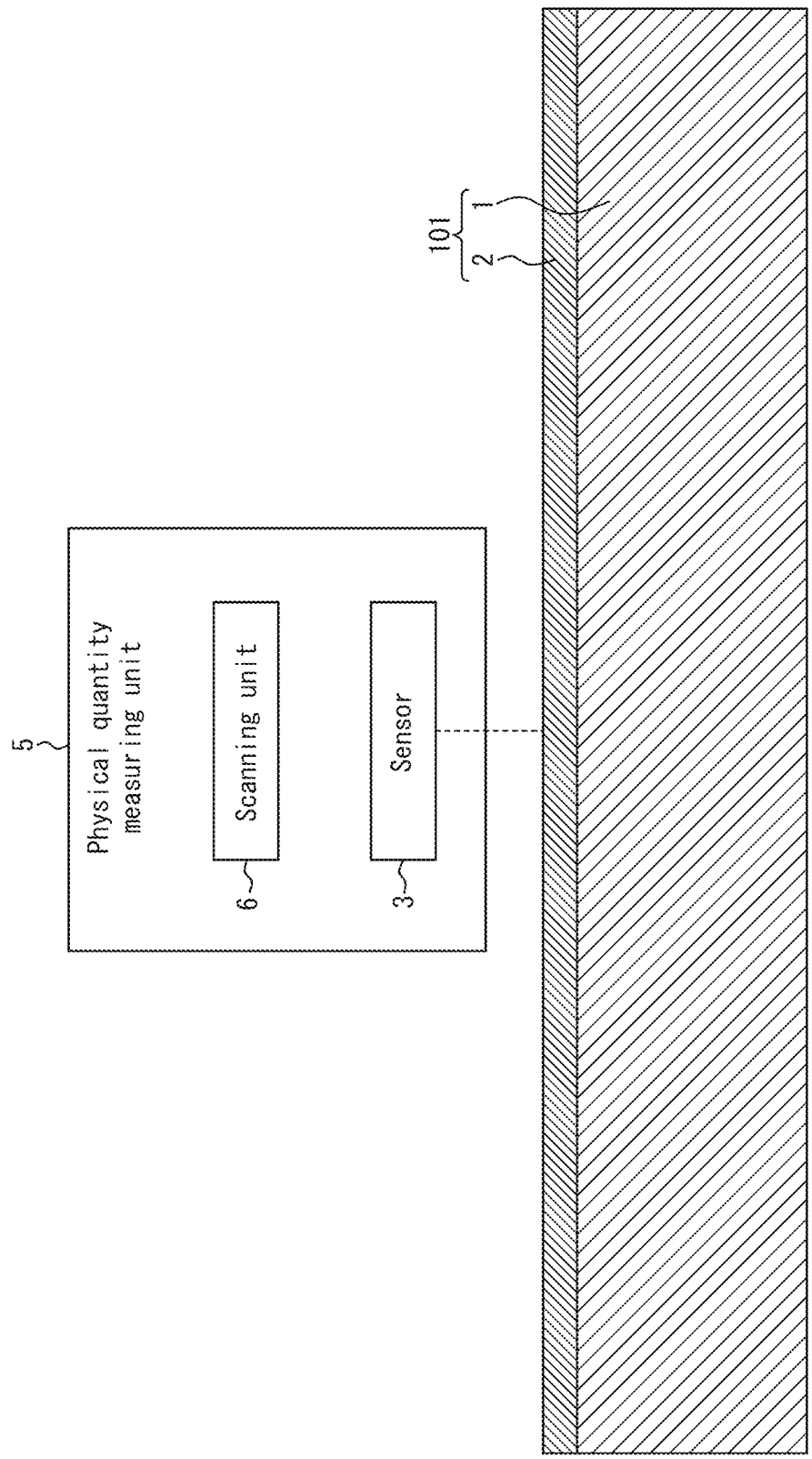
FIG. 2 is a block diagram of a physical quantity measuring unit.

FIG. 2 is a block diagram of the physical quantity measuring unit 5. The physical quantity measuring unit 5 includes a sensor 3 and a scanning unit 6. The sensor 3 measures the physical quantities of the measured object 101. The measured object 101 includes the substance 1 and the film 2 formed on the surface of the substance 1. The details of each component in the physical quantity measuring unit 5 will be described later.

For example, in the case where the substance 1 is a steel material, an iron oxide film called scale or mill scale forms on the surface of the steel material during the production of the steel material. There are various types of iron oxide films, and magnetite (triiron tetraoxide, $Fe_3O_4$), wustite (ferrous oxide, FeO), and hematite (red hematite, $Fe_2O_3$) are commonly known. These scales differ not only in the composition of oxygen and iron but also in electromagnetic features (i.e. electromagnetic characteristics). For example, magnetite is magnetic, but wustite is not magnetic. To measure the mechanical property of the substance 1 (in particular the surface layer) which is a steel material, the physical quantities are measured from the surface. That is, in the present disclosure, the physical quantities are measured with the substance 1, which is a steel material, and the film 2, which is scale, together as the measured object 101.

Accordingly, the film 2 which is scale influences the measurement of the substance 1 which is a steel material. The type and composition of the scale vary depending on the state during the production of the steel material. Moreover, the steel material may have magnetic anisotropy depending on the microstructure of the steel material. Thus, the electromagnetic features differ among measured objects 101. It is therefore very difficult to, for the measured object 101 including the steel material and the scale, measure or evaluate the mechanical property, such as hardness, of the steel material by simply associating the mechanical property with the electromagnetic feature values of the measured object 101. Especially in the case of measuring the mechanical property of the surface layer of the substance 1, the electromagnetic features of the scale as the film 2 have greater influence. This makes it more difficult to, for the measured object 101 including the steel material and the scale, measure or evaluate the mechanical property, such as hardness, of the surface layer of the steel material by simply associating the mechanical property with the electromagnetic feature values of the measured object 101.

The same applies to when the substance 1 is other than a steel material and the film 2 is other than scale. In particular, in the case where the film 2 has different features from the substance 1 with regard to the plurality of physical quantities to be measured, it is very difficult to, for the measured object 101 including the substance 1 and the film 2 on its surface, measure or evaluate the mechanical property of the substance 1 by simply associating the mechanical property with the plurality of physical quantities of the measured object 101. Moreover, in the case of measuring the mechanical property of the surface layer of the substance 1, it is more difficult to, for the measured object 101 including the substance 1 and the film 2 on its surface, measure or evaluate the mechanical property of the surface layer of the substance 1 by simply associating the mechanical property with the plurality of physical quantities of the measured object 101.

Figure 12:
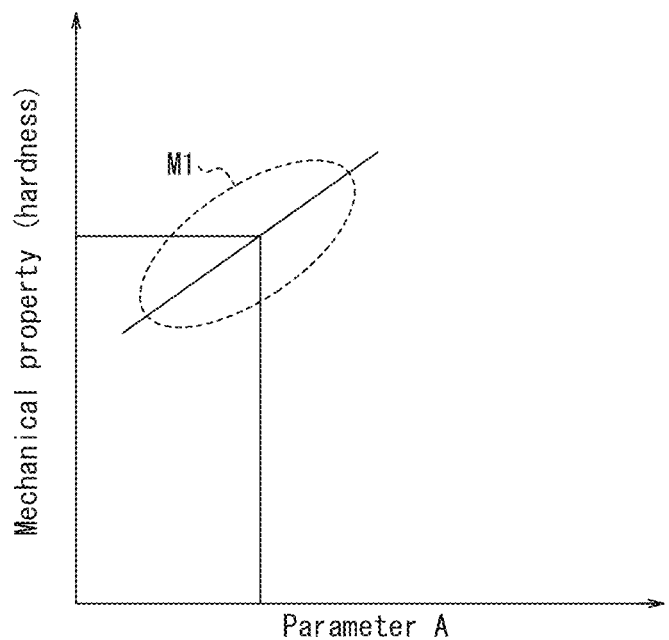
FIG. 12 is a diagram illustrating an example of the correspondence between one parameter and one mechanical property in the case where there is one model.
Figure 13:
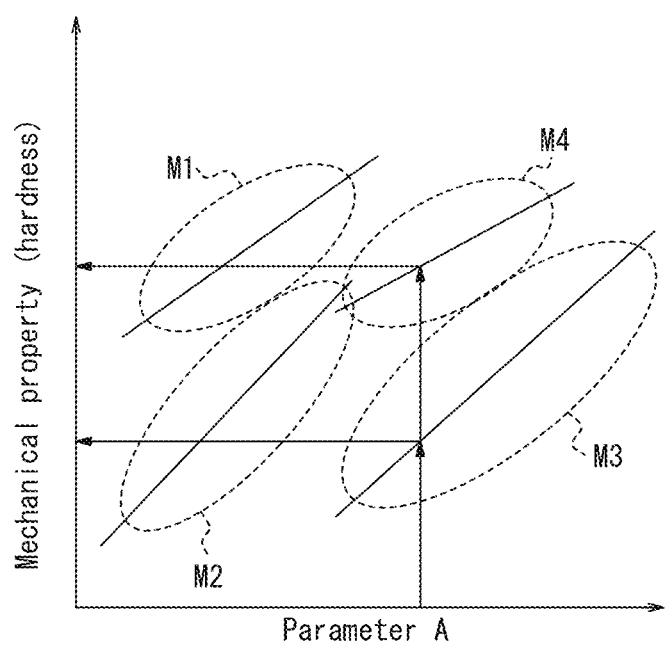
FIG. 13 is a diagram illustrating an example of the correspondence between one parameter and one mechanical property in the case where there are a plurality of models.
Figure 14:
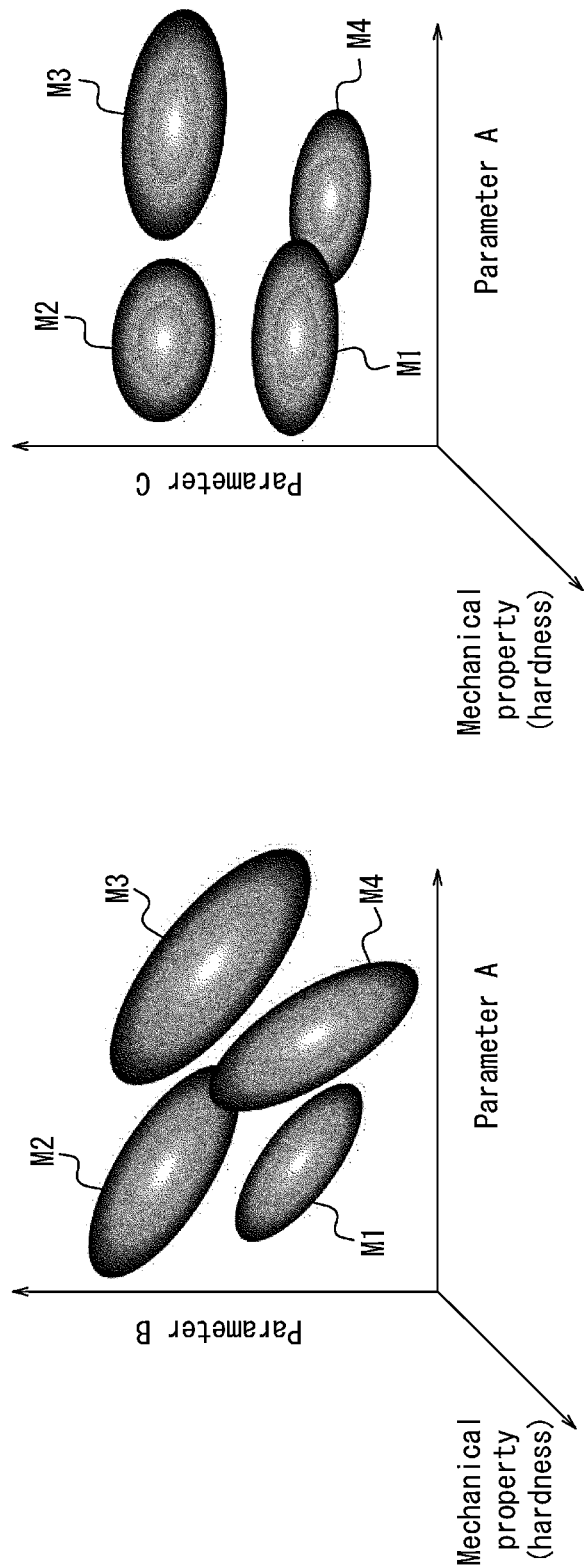
FIG. 14 is a diagram explaining separation of a distribution by a plurality of parameters in the case where there are a plurality of models.

The difficulty of measuring or evaluating the mechanical property of the substance 1 by simply associating the mechanical property with the plurality of physical quantities of the measured object 101 will be described below, with reference to FIG. 12 to FIG. 14. FIG. 12 is a diagram illustrating an example of the correspondence between one parameter and one mechanical property in the case where there is one model. In the case where one mathematical model (e.g. model M1 in FIG. 12) that links any one parameter A (e.g. one electromagnetic feature value) and a mechanical property in a one-to-one relationship can be constructed, the model can be used to calculate the mechanical property (hardness in the example in FIG. 12 to FIG. 14) from the parameter A. However, for example in the case where the substance 1 is a steel material, there are actually elements that constitute the surface layer structure such as steel microstructure distribution and scale (an example of the film 2). Hence, the correlation between any one parameter A and the mechanical property involves a plurality of relationships (models M1, M2, M3, and M4) according to the combination of the substance 1 and the film 2 constituting the surface layer structure, as illustrated in FIG. 13. For example, the models M2 and M3 may correspond to the case where the scale is thick and the case where the scale is thin, respectively. As illustrated in FIG. 13, there is a possibility that two different hardness values are calculated even when the measured value of the parameter A is the same, causing a decrease in hardness calculation accuracy. Such a decrease in hardness calculation accuracy can be avoided by selecting an appropriate model. However, for example in the case where there are a plurality of models that output similar mechanical property values for a given value of one parameter A (e.g. in a region including the upper right end of the model M2 and the lower left end of the model M4 in FIG. 13), there is a possibility that the plurality of models are recognized as one model. This problem can be solved by using a plurality of parameters to thus recognize each model separately, as illustrated in FIG. 14. In the example in FIG. 14, a combination of parameters A and B is used to separately recognize the model M1, the model M3, and a distribution combining the models M2 and M4. Moreover, a combination of parameters A and C is used to separately recognize the model M2 and the model M4. Although not illustrated in the drawing, additionally using a combination of parameters B and C can further ensure that the models are recognized separately. By using a plurality of parameters in this way, the data set of each model can be determined. An appropriate model can then be selected from the determined plurality of models and used to accurately measure or evaluate the mechanical property.

The storage unit 10 stores various information and programs for causing the measuring apparatus 100 to operate. The information stored in the storage unit 10 may include the plurality of calculation models $M_1, M_2, \ldots, M_n$ prepared beforehand to calculate the mechanical property of the substance. The programs stored in the storage unit 10 include a program for causing the control unit 8 to operate as the selection processing unit 81, a program for causing the control unit 8 to operate as the mechanical property calculating unit 82, and a program for causing the control unit 8 to operate as the physical quantity measurement control unit 83. The storage unit 10 includes, for example, semiconductor memory or magnetic memory. The storage unit 10 may store information of the range or boundary of each of the below-described groups $G_1, G_2, \ldots, G_n$ prepared beforehand.

The display 11 displays various information including the mechanical property of the substance 1 to a user. In this embodiment, the display 11 includes a display capable of displaying text, images, etc. and a touch screen capable of detecting contact with the user's finger or the like. The display may be a display device such as a liquid crystal display (LCD) or an organic electroluminescence display (OELD). The detection method of the touch screen may be any method such as capacitive, resistive, surface acoustic wave, infrared, electromagnetic induction, or load detection. Alternatively, the display 11 may be composed of a display without a touch screen.

The control unit 8 controls the overall operation of the measuring apparatus 100. The control unit 8 includes one or more processors. The processors may include a general-purpose processor that reads a specific program and executes a specific function and/or a dedicated processor dedicated to a specific process. The dedicated processor may include an application specific integrated circuit (ASIC). Each processor may include a programmable logic device (PLD). The PLD may include a field-programmable gate array (FPGA). The control unit 8 may include at least one of a system in a package (SiP) and a system on a chip (SoC) in which one or more processors cooperate with each other. The control unit 8 functions as each of the selection processing unit 81, the mechanical property calculating unit 82, and the physical quantity measurement control unit 83 according to the corresponding program read from the storage unit 10.

The control unit 8 may have a function of generating the plurality of calculation models $M_1, M_2, \ldots, M_n$ after completing collection of learning data. The control unit 8 also sets the range or boundary of each of the groups $G_1, G_2, \ldots, G_n$ respectively corresponding to the plurality of calculation models $M_1, M_2, \ldots, M_n$. For example, in the case where the measured object 101 is determined to belong to a group $G_i$ based on the electromagnetic feature values, a calculation result using the corresponding calculation model $M_i$ is used, where i is an integer from 1 to n. The details of the model generation will be described later.

The mechanical property calculating unit 82 calculates the mechanical property of the substance 1 for each of the plurality of calculation models $M_1, M_2, \ldots, M_n$, using the plurality of calculation models $M_1, M_2, \ldots, M_n$ and at least two of the plurality of physical quantities measured by the physical quantity measuring unit 5. That is, the mechanical property calculating unit 82 calculates the same number of mechanical properties (i.e. the same number of values of the mechanical property) of the substance 1 as the calculation models $M_1, M_2, \ldots, M_n$. As an example, suppose the plurality of physical quantities include the foregoing electromagnetic feature values, and all of current waveform distortion amount, current waveform amplitude, harmonic amplitude, magnetic permeability, and coercive force are used to calculate the mechanical property of the substance 1. The mechanical property calculating unit 82 acquires the plurality of calculation models $M_1, M_2, \ldots, M_n$ from the storage unit 10. The mechanical property calculating unit 82 inputs the values of current waveform distortion amount, current waveform amplitude, harmonic amplitude, magnetic permeability, and coercive force acquired via a communication unit 7 to each of the plurality of calculation models $M_1, M_2, \ldots, M_n$. The mechanical property calculating unit 82 thus calculates the mechanical property of the substance 1 for each of the plurality of calculation models $M_1, M_2, \ldots, M_n$, and as a result obtains n mechanical properties.

The selection processing unit 81 selects one of the calculated plurality of mechanical properties of the substance 1, based on at least two of the plurality of physical quantities of the measured object 101 measured by the physical quantity measuring unit 5. The selected one mechanical property is the mechanical property of the substance 1 selected from the n mechanical properties as candidates and finally output. As an example, suppose all of the electromagnetic feature values of current waveform distortion amount, current waveform amplitude, harmonic amplitude, magnetic permeability, and coercive force are used to select an appropriate calculation model $M_i$. First, the selection processing unit 81 acquires the information of the range or boundary of each of the groups $G_1, G_2, \ldots, G_n$ from the storage unit 10. The selection processing unit 81 then determines which of the groups $G_1, G_2, \ldots, G_n$ the combination of the values of current waveform distortion amount, current waveform amplitude, harmonic amplitude, magnetic permeability, and coercive force acquired via the communication unit 7 belongs to. In the case where the combination of the values is determined to belong to the group $G_i$, the selection processing unit 81 selects the calculation model $M_i$ corresponding to the group $G_i$. The selection processing unit 81 then selects the mechanical property of the substance 1 based on the calculation model $M_i$. After the selection processing unit 81 selects one mechanical property of the substance 1 as the final mechanical property of the substance 1, the control unit 8 may output the mechanical property to the display 11 to present it to the user.

Although the selection processing unit 81 uses all of the electromagnetic feature values when selecting the calculation model $M_i$, in the foregoing example, a combination of two or more but not all of the electromagnetic feature values may be used. Although the mechanical property calculating unit 82 uses all of the electromagnetic feature values when calculating the mechanical property of the substance 1 in the foregoing example, two or more but not all of the electromagnetic feature values may be input to the calculation model $M_i$. Here, the electromagnetic feature values input to the calculation model $M_i$ may be different from the electromagnetic feature values used when the selection processing unit 81 selects the calculation model $M_i$. For example, the selection processing unit 81 selects the calculation model $M_i$ using a combination of current waveform distortion amount and current waveform amplitude, and the mechanical property calculating unit 82 inputs current waveform amplitude, harmonic amplitude, and magnetic permeability to the calculation model $M_i$ and calculates the mechanical property of the substance 1.

The physical quantity measurement control unit 83 controls the operation of the physical quantity measuring unit 5. For example, the physical quantity measurement control unit 83 causes the sensor 3 to operate and measure the electromagnetic feature values.

(Structure of Physical Quantity Measuring Unit)

The sensor 3 measures the physical quantities of the measured object 101 including the substance 1 and the film 2. Although this embodiment describes an example in which the sensor 3 is a magnetic sensor, the sensor 3 is not limited to a magnetic sensor. The sensor 3 may be composed of one or more sensors. The measurement results of the sensor 3 indicate the physical quantities involving the influence of the film 2, that is, the physical quantities in a state in which not only the substance 1 but also the film 2 is included. On the other hand, the mechanical property calculated by the mechanical property calculating unit 82 relates to the substance 1 without the film 2.

Figure 3:
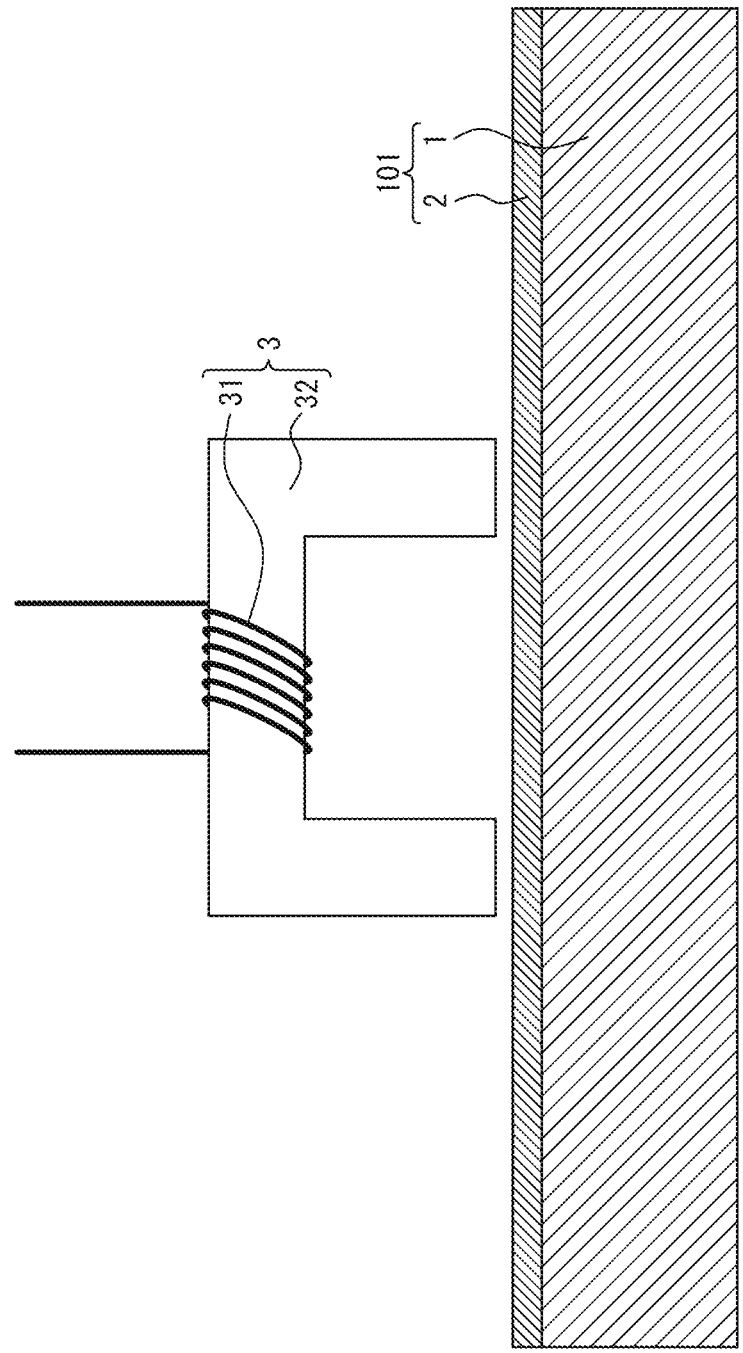
FIG. 3 is a diagram illustrating a specific example of the structure of a sensor.

FIG. 3 is a diagram illustrating a specific example of the structure of the sensor 3. The sensor 3 is, for example, a magnetic sensor, and may include an excitation coil 31 and a magnetizing yoke 32. The sensor 3 applies an alternating magnetic field to the measured object 101 while moving relative to the measured object 101. In the sensor illustrated in FIG. 3, one coil is used as both an excitation coil and a coil for measuring electromagnetic changes. The sensor 3 measures the influence of eddy current or the like induced in the measured object 101 by the alternating magnetic field, as changes in electromagnetic feature values. As another example, the sensor that measures the electromagnetic feature values may have a structure in which an excitation coil is wound around a magnetizing yoke and a coil for signal reception is wound separately from the excitation coil. As yet another example, the sensor that measures the electromagnetic feature values may have a structure in which an excitation coil is wound around a magnetizing yoke and a coil for measuring electromagnetic changes is placed independently between the magnetizing yokes. The sensor that measures the electromagnetic feature values is not limited to the structure illustrated in FIG. 3, as long as it includes an excitation coil, a coil for measuring electromagnetic changes, and a magnetizing yoke.

As the physical quantities of the steel material to be measured, the electromagnetic feature values of the surface layer may be used. It is known that, in a steel material, changes in a magnetic hysteresis curve and Barkhausen noise correlate with the mechanical property of the material such as tensile strength and hardness. Hence, it is preferable to measure the electromagnetic feature values of the surface layer by the magnetic sensor illustrated in FIG. 3. The magnetic hysteresis curve is also called a B-H curve, and is a curve indicating the relationship between the magnetic field strength and the magnetic flux density. Moreover, based on the phenomenon (skin effect) that, when an alternating current flows through a conductor, the current density is high at the surface of the conductor and decreases with the distance away from the surface, the electromagnetic feature values of only the surface layer of the measured object can be selectively measured by the magnetic sensor. In the skin effect, when the frequency of the alternating current is higher, the current concentrates more on the surface. Assuming that the penetration depth is the depth at which the current is approximately 0.37 times the surface current due to the skin effect, the relationship is given by the following formula (1). In formula (1), d is penetration depth [m], f is frequency [Hz], μ is magnetic permeability [H/m], σ is electrical conductivity [S/m], and π is circular constant.

$$d = \sqrt{\frac{1}{\pi \times f \times \mu \times \sigma}}. \quad \text{formula (1)}$$

As defined in formula (1), the penetration depth is shallower when the frequency is higher. In other words, the penetration depth is deeper when the frequency is lower. Hence, the penetration depth can be adjusted by adjusting the frequency according to the surface layer depth range to be measured or evaluated. For example, to measure or evaluate the mechanical property up to about 0.25 mm of the surface layer, the frequency is determined so that the penetration depth will be about 0.25 mm. Preferably, ¾ of the penetration depth is greater than 0.25 mm with respect to the surface layer depth, in consideration of attenuation.

Figure 4:
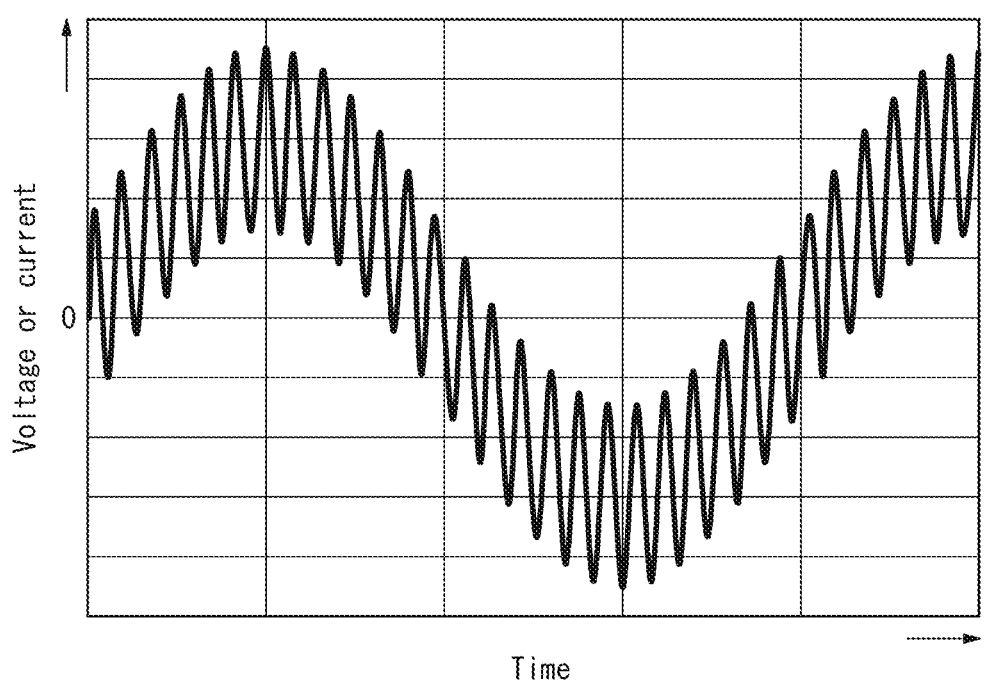
FIG. 4 is a diagram illustrating an example of a signal applied to an excitation coil to generate an alternating magnetic field.

FIG. 4 illustrates an example of a signal applied to the excitation coil 31 to generate an alternating magnetic field. The signal in FIG. 4 is a signal obtained by superimposing a high frequency signal on a low frequency signal. By using such a signal, the sensor 3 can efficiently measure the electromagnetic feature values based on the low frequency signal and the electromagnetic feature values based on the high frequency signal. The low frequency signal is, for example, a sine wave of 150 Hz. The high frequency signal is, for example, a sine wave of 1 kHz. By superimposing the high frequency signal and the low frequency signal, even in the case where the film 2 is formed on the substance 1, the electromagnetic feature values can be easily measured to the surface layer of the substance 1. For example, in the case where the film 2 is thin, if the relative magnetic permeability of the film 2 (i.e. the ratio of the magnetic permeability of the substance to the magnetic permeability of a vacuum) is low, magnetism penetrates easily. In the case where magnetism penetrates easily, the electromagnetic feature values may be measured using only an appropriate high frequency signal. For example, in the case where the film 2 is thick, if the relative magnetic permeability of the substance forming the film 2 is high, magnetism does not penetrate easily, and the signal is hard to reach the substance 1. In the case where magnetism does not penetrate easily, superimposing a high frequency signal on a low frequency signal allows magnetism to reach deeper. Here, the low frequency signal may be a DC signal. Alternatively, the low frequency signal may be a sine-wave signal or a rectangular signal.

The scanning unit 6 moves the sensor 3 relative to the measured object 101. The scanning unit 6 may move the sensor 3 to an evaluation location designated by the physical quantity measurement control unit 83. The scanning unit 6 may acquire information of the moving speed of the substance 1, and adjust the sensor 3 to move at an appropriate relative speed.

(Collection of Learning Data and Model Generation)

The mechanical property measuring apparatus 100 according to this embodiment calculates the mechanical property of the substance 1 based on the physical quantities of the measured object 101 measured by the physical quantity measuring unit 5. For example, the measured object 101 is a steel material having scale. For example, the physical quantities include electromagnetic feature values.

For example, the mechanical property of the substance 1 is the hardness of the steel material. To accurately measure the mechanical property, it is important to select an appropriate calculation model $M_i$ based on the correctness of the plurality of calculation models $M_1, M_2, \ldots, M_n$ and the physical quantities. The measuring apparatus 100 collects learning data, generates the plurality of calculation models $M_1, M_2, \ldots, M_n$, and sets the range of each of the groups $G_1, G_2, \ldots, G_n$ in the following manner.

Figure 5:
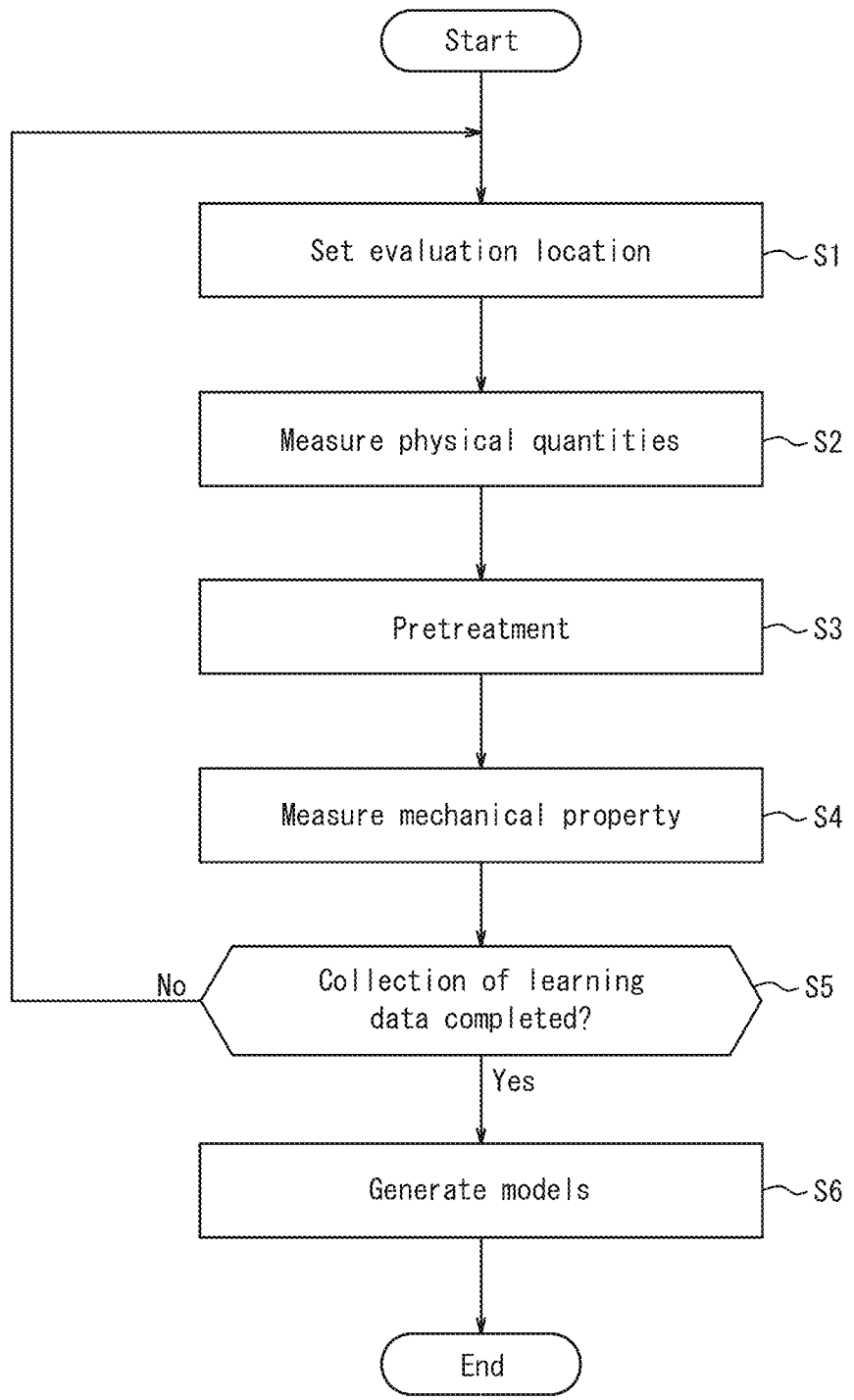
FIG. 5 is a flowchart illustrating a learning data collection process.

FIG. 5 is a flowchart illustrating a learning data collection process. The control unit 8 sets a position in the measured object 101 at which the physical quantities are to be measured, i.e. an evaluation location (step S1).

The control unit 8 causes the physical quantity measuring unit 5 to measure the physical quantities in the set evaluation location (step S2). In the learning data, the physical quantities of the measured object 101 are explanatory variables.

The control unit 8 performs pretreatment (step S3). The pretreatment is, for example, removing the film 2 from the measured object 101 to enable the measurement of the mechanical property in the evaluation location. For example, in the case where the measured object 101 is a steel material having scale on its surface, the scale may be removed by etching, grinding, or the like. The pretreatment may include cutting the measured object 101 at the evaluation location to expose a cross-section of the substance 1.

The control unit 8 measures the mechanical property in the evaluation location (step S4). The learning data includes the mechanical property as an objective variable. The mechanical property may be, for example, the hardness of the cross-section of the steel material in the evaluation location. As the mechanical property, for example, a value obtained by converting the Leeb hardness of the surface of the steel material measured by a rebound hardness meter into the hardness of the cross-section using a conversion formula obtained from past tests may be used. For more accurate conversion, a value obtained by normalizing the converted value with respect to the thickness of the steel material may be used. That is, a process of conversion into a value at the reference thickness of the steel material may be performed. The reference thickness of the steel material is, for example, 28 mm. In the case where the foregoing pretreatment involves cutting the measured object 101 at the evaluation location, the mechanical property may be the Vickers hardness obtained by directly measuring the cut surface. The control unit 8 acquires the measured mechanical property. The control unit 8 stores a data label such as the management number and the evaluation location of the substance 1, the explanatory variables, and the objective variable in the storage unit 10 in association with each other as one piece of learning data.

In the case where the control unit 8 determines that learning data sufficient for model generation has not been collected (step S5: No), the control unit 8 returns to the process in step S1 and further collects learning data.

In the case where the control unit 8 determines that learning data sufficient for model generation has been collected and the collection has been completed (step S5: Yes), the control unit 8 advances to the process in step S6.

The learning data set stored in the storage unit 10 by the control unit 8, i.e. the set of a plurality of pieces of learning data, may include objective variables obtained by different methods. In the foregoing example, the learning data set may include objective variables obtained by at least two methods from among the Vickers hardness obtained by directly measuring the cut surface, the value obtained by converting the Leeb hardness of the surface of the steel material into the hardness of the cross-section, and the value obtained by normalizing the converted value with respect to the thickness of the steel material. For example, the Vickers hardness is accurate, but measuring the Vickers hardness takes time because the steel material is cut. By allowing for a mixture of objective variables obtained by different measurement methods, an accurate learning data set can be generated within a realistic time.

The control unit 8 divides the learning data included in the learning data set into the groups $G_1, G_2, \ldots, G_n$ by machine learning. In the grouping, machine learning may be performed based on the electromagnetic feature values and other parameters. Appropriate division by machine learning may be performed after setting groups (original groups) based on part of the electromagnetic feature values and other parameters beforehand. The other parameters may include, for example, at least one of the composition of film 2 and the microstructure of the substance 1. As the method of dividing into the groups $G_1, G_2, \ldots, G_n$, logistic regression, support vector machines, k-nearest neighbors algorithm, random tree logic, or the like may be used. Of these, it is most preferable to classify the learning data into the groups $G_1, G_2, \ldots, G_n$ by a support vector machine because the boundary can be set so as to maximize the margins for the learning data set of each group.

The control unit 8 stores the information of the range or boundary of each of the groups $G_1, G_2, \ldots, G_n$ determined by the foregoing method, in the storage unit 10. Particularly in the case where the substance 1 is a steel material, the mechanical property is influenced by the property of the scale as the film 2. It is therefore preferable to perform grouping by machine learning based on the composition of the film 2. For more accurate mechanical property calculation, it is preferable to perform machine learning based on the microstructure of the substance 1 in consideration of the influence of the magnetic anisotropy of the steel material.

The control unit 8 generates the calculation models $M_1, M_2, \ldots, M_n$ respectively for the groups $G_1, G_2, \ldots, G_n$ (step S6). For example, the control unit 8 generates the calculation model $M_1$ based on the learning data classified into the group $G_i$. The calculation model $M_i$ may be prepared as a linear regression model or a nonlinear regression model that links the explanatory variables and the objective variable of the learning data. As the linear regression model, a generalized linear model, a generalized linear mixed model, or the like may be used. A neural network using deep learning may be employed. The linear regression model is more accurate than the nonlinear regression model in the case of extrapolation. It is therefore most preferable to use the linear regression model. Preferably, grouping is performed by machine learning based on the property of at least one of the substance 1 and the film 2 to generate the plurality of calculation models $M_1, M_2, \ldots, M_n$ according to the property of at least one of the substance 1 and the film 2, as mentioned above. The control unit 8 stores the generated plurality of calculation models $M_1, M_2, \ldots, M_n$ in the storage unit 10, and ends the series of processes.

(Mechanical Property Measuring Method)

The mechanical property measuring apparatus 100 according to this embodiment calculates the mechanical property of the substance 1 based on the physical quantities of the measured object 101 measured by the physical quantity measuring unit 5. For example, the measured object 101 is a steel material having scale. For example, the substance 1 is the steel material. For example, the film 2 on the surface of the substance 1 is the scale. For example, the physical quantities include electromagnetic feature values.

Figure 6:
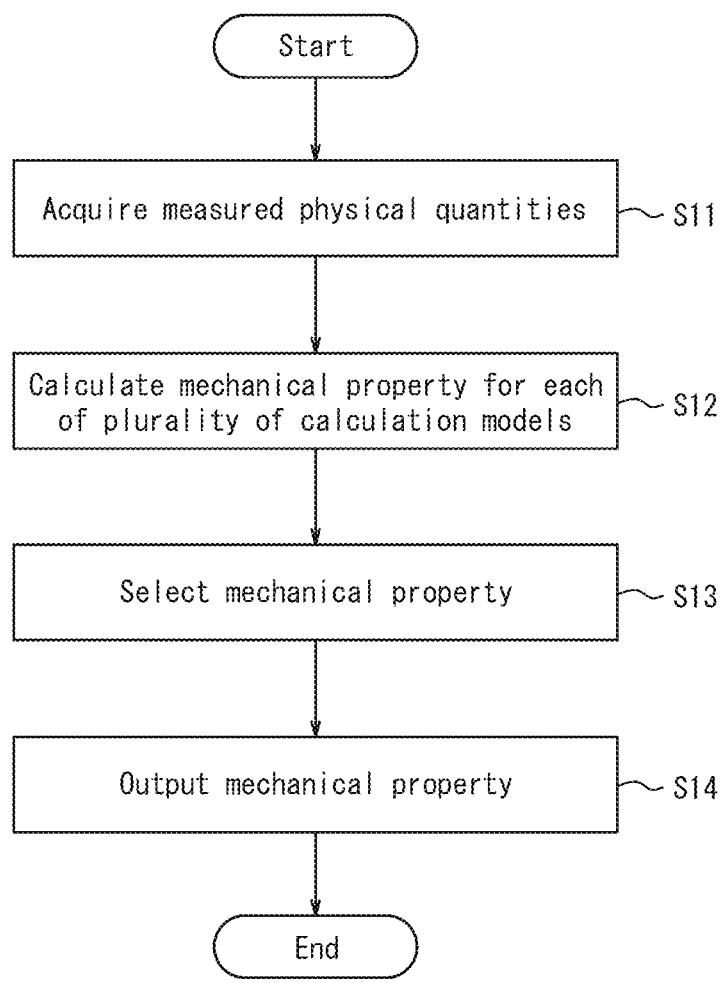
FIG. 6 is a flowchart illustrating a mechanical property measuring method.

For example, the mechanical property of the substance 1 is the hardness of the steel material. For example, the sensor 3 is the magnetic sensor illustrated in FIG. 2 and FIG. 3. In the calculation of the mechanical property of the substance 1, one of the plurality of calculation models $M_1, M_2, \ldots, M_n$ is used. To accurately calculate the mechanical property, it is important to select an appropriate calculation model $M_i$ based on the correctness of the plurality of calculation models $M_1, M_2, \ldots, M_n$ and the physical quantities. The mechanical property measuring apparatus 100 according to this embodiment calculates the mechanical property of the substance 1 in the following manner. FIG. 6 is a flowchart illustrating a mechanical property measuring method. The plurality of calculation models $M_1, M_2, \ldots, M_n$ have been prepared and stored in the storage unit 10 in the mechanical property measuring apparatus 100 beforehand prior to the measurement of the measured object 101.

The control unit 8 causes the physical quantity measuring unit 5 to measure the physical quantities of the measured object 101 (measurement step, step S11). To measure the mechanical property of the substance 1 (in particular the surface layer), the physical quantities are measured from the surface of the substance 1 on which the film 2 is formed. That is, in this measurement method, the physical quantities are measured with the substance 1, which is a steel material, and the film 2, which is scale, together as the measured object 101. The same applies to when the substance 1 is other than a steel material and the film 2 is other than scale. Specifically, the sensor 3 in the physical quantity measuring unit 5 is located at the surface of the film 2. The measurement results of the sensor 3 indicate the physical quantities involving the influence of the film 2, that is, the physical quantities in a state in which not only the substance 1 but also the film 2 is included. The scanning unit 6 moves the sensor 3 relative to the measured object 101. As a result, the sensor 3 applies an alternating magnetic field to an evaluation location in the measured object 101 designated by the physical quantity measurement control unit 83. The sensor 3 measures the influence of eddy current or the like induced in the measured object 101 by the alternating magnetic field, as changes in electromagnetic feature values. The physical quantity measuring unit 5 outputs the measured electromagnetic feature values to the control unit 8 as a plurality of physical quantities.

The control unit 8 calculates the mechanical property of the substance 1 for each of the plurality of calculation models $M_1, M_2, \ldots, M_n$ prepared beforehand to calculate the mechanical property of the substance (calculation step, step S12). The calculation models $M_1, M_2, \ldots, M_n$ may each be prepared as a linear regression model or a nonlinear regression model that links at least two of the physical quantities of the measured object 101 as the explanatory variables and the mechanical property of the substance 1 as the objective variable. As the linear regression model, a generalized linear model, a generalized linear mixed model, or the like may be used. A neural network using deep learning may be employed. The linear regression model is more accurate than the nonlinear regression model in the case of extrapolation. It is therefore most preferable to use the linear regression model. Preferably, grouping is performed by machine learning based on the property of at least one of the substance 1 and the film 2 to generate the plurality of calculation models $M_1, M_2, \ldots, M_n$ according to the property of at least one of the substance 1 and the film 2, as mentioned above. The control unit 8 calculates the mechanical property of the substance 1 for each of the plurality of calculation models $M_1, M_2, \ldots, M_n$, using the plurality of calculation models $M_1, M_2, \ldots, M_n$ and at least two physical quantities necessary as input.

Based on at least two of the physical quantities, the control unit 8 selects the mechanical property that is based on one of the plurality of calculation models $M_1, M_2, \ldots, M_n$, as the mechanical property of the substance 1 (selection step, step S13). Specifically, based on the information of the range or boundary of each of the groups $G_1, G_2, \ldots, G_n$ prepared and stored in the storage unit 10 beforehand, the control unit 8 determines the group $G_i$ to which the combination of the values of at least two of the physical quantities belongs. The control unit 8 selects the calculation model $M_i$ corresponding to the determined group $G_i$, and sets the mechanical property of the substance 1 calculated using the selected calculation model $M_i$ as one mechanical property of the substance 1 measured in this measurement method. As the method of dividing into the groups $G_1, G_2, \ldots, G_n$, logistic regression, support vector machines, k-nearest neighbors algorithm, random tree logic, or the like may be used, as mentioned above. Of these, it is most preferable to classify the learning data into the groups $G_1, G_2, \ldots, G_n$ by a support vector machine because the boundary can be set so as to maximize the margins for the learning data set of each group. In the case of storing the range of each of the groups $G_1, G_2, \ldots, G_n$ in the storage unit 10 in the mechanical property measuring apparatus 100, the range of each of the groups $G_1, G_2, \ldots, G_n$ is prepared and stored beforehand prior to the measurement of the measured object 101.

The mechanical property of the substance 1 may be, for example, the hardness of the cross-section of the steel material in the evaluation location. As the mechanical property, for example, a value obtained by converting the Leeb hardness of the surface of the steel material measured by a rebound hardness meter into the hardness of the cross-section using a conversion formula obtained from past tests may be used. For more accurate conversion, a value obtained by normalizing the converted value with respect to the thickness of the steel material may be used. That is, a process of conversion into a value at the reference thickness of the steel material may be performed. The reference thickness of the steel material is, for example, 28 mm. In the case where the foregoing pretreatment involves cutting the measured object 101 at the evaluation location, the mechanical property may be the Vickers hardness obtained by directly measuring the cut surface.

The control unit 8 outputs the mechanical property of the substance 1 to the display 11 (output step, step S14), and ends the series of processes. The mechanical property of the substance 1 displayed by the display 11 is recognized by the user. The user may, for example, perform management for the substance 1 or issue an instruction to change the production parameters of the substance 1, based on the displayed mechanical property of the substance 1.

As described above, with the mechanical property measuring apparatus 100 and the mechanical property measuring method executed by the measuring apparatus 100 according to this embodiment, the mechanical property can be measured accurately through the physical quantities. In particular, in the case where the film 2 has different features from the substance 1 with regard to the plurality of physical quantities to be measured, a more appropriate calculation model can be selected by the selection processing unit 81 or the selection step (step S13), so that the foregoing effects can be further enhanced. Moreover, in the case of measuring the mechanical property of the surface layer of the substance 1, a more appropriate calculation model can be selected by the selection processing unit 81 or the selection step (step S13), so that the foregoing effects can be further enhanced. The foregoing effects can be equally achieved in the below-described Embodiments 2 and 3.

EXAMPLES

The effects according to the present disclosure will be described in detail below by way of examples, although the present disclosure is not limited to these examples.

Example 1

In Example 1, the measuring apparatus 100 is a apparatus that measures the hardness of the surface layer of a steel material. In this example, the substance 1 is the steel material. The film 2 is scale formed on the surface of the steel material. The sensor 3 is an electromagnetic sensor. The physical quantities of the measured object 101 are the electromagnetic feature values of the steel material having the scale. The mechanical property to be measured in this example is the hardness of a cross-section of the steel material at a depth of 0.25 mm.

The steel material was manufactured by subjecting a continuously cast slab to rough rolling and further to quenching by continuous cooling online. To collect learning data, the hardness of a cross-section at a depth of 0.25 mm was measured for the steel material manufactured by this production process.

In this example, electromagnetic sensors capable of measuring electromagnetic feature values were mounted in the measuring apparatus 100, and the electromagnetic feature values of the surface layer of the steel material having scale on its surface were measured. As the scanning unit 6, a truck moved by human power was used. Eight electromagnetic sensors were arranged side by side in the truck. The eight electromagnetic sensors scanned the whole surface of the steel material.

A voltage obtained by superimposing a sine wave with a frequency of 1 kHz or more on a sine wave with a frequency of 150 Hz or less was applied to each electromagnetic sensor. A plurality of types of electromagnetic feature values were extracted from the current waveforms observed by the electromagnetic sensors. In this example, 20 feature values such as the distortion amount, amplitude, and phase change of the current waveform, the amplitude and phase change of the harmonic, the maximum value, minimum value, and average value of the incremental magnetic permeability, and the coercive force were extracted as the electromagnetic feature values. Here, the frequency of the sine wave applied was limited to 150 Hz or less so that an alternating magnetic field excited by each electromagnetic sensor would penetrate to a depth of about 300 μm from the surface of the steel material. The incremental magnetic permeability is a value indicating magnetizability in a state in which a magnetic field is applied, and is expressed by the gradient of a minor loop in a magnetization curve that indicates the relationship between the magnetic flux density and the magnetic field.

After the collection of the learning data, three groups $G_1$, $G_2$, and $G_3$ were generated based on the relationship among the composition of the scale, the microstructure of the steel material, the electromagnetic feature values, and the cross-sectional hardness. A support vector machine was used for machine learning in the grouping. For the three groups $G_1$, $G_2$, and $G_3$, a plurality of calculation models $M_1$, $M_2$, and $M_3$ were respectively generated by machine learning using a generalized linear regression model.

To calculate the hardness of the surface layer of the steel material, the measuring apparatus 100 measured the electromagnetic feature values by the physical quantity measuring unit 5. The control unit 8 calculated the hardness using each of the calculation models $M_1$, $M_2$, and $M_3$. The control unit 8 then determined a group to which the measured electromagnetic feature values belong, and selected the hardness calculated using the determined calculation model $M_1$, $M_2$ or $M_3$ as the measured hardness of the steel material.

Figure 7:
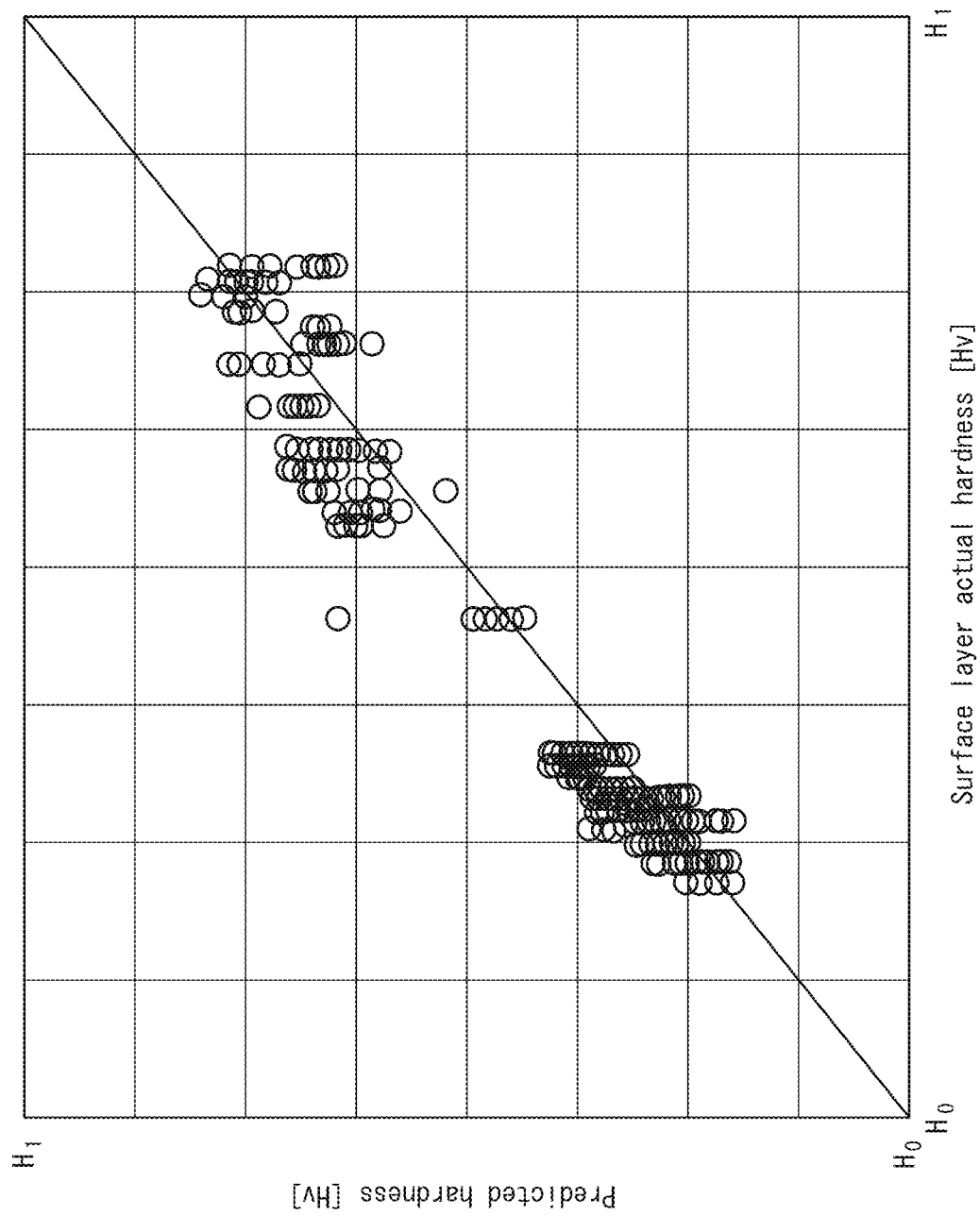
FIG. 7 is a diagram comparing calculated mechanical property values and actual measured values.

FIG. 7 is a diagram comparing hardness values obtained for the steel material in this example and actual measured values obtained by a hardness meter. The surface layer actual hardness on the horizontal axis is the actual measured value, which is the hardness obtained by cutting out a test piece and measuring it using a rebound hardness meter. The predicted hardness on the vertical axis is the hardness of the steel material obtained in this example, calculated using the calculation model $M_1$, $M_2$, or $M_3$ and the groups $G_1$, $G_2$, and $G_3$. Here, hardness $H_0$ and hardness $H_1$ are respectively the lower limit and the upper limit of the hardness to be measured. As illustrated in FIG. 7, the predicted hardness roughly matched the surface layer actual hardness, and measurement was able to be performed with an accuracy of about 9 Hv in standard deviation. This indicates that the hardness calculated by the foregoing method has approximately the same level of accuracy as the hardness test.

Example 2

Figure 10:
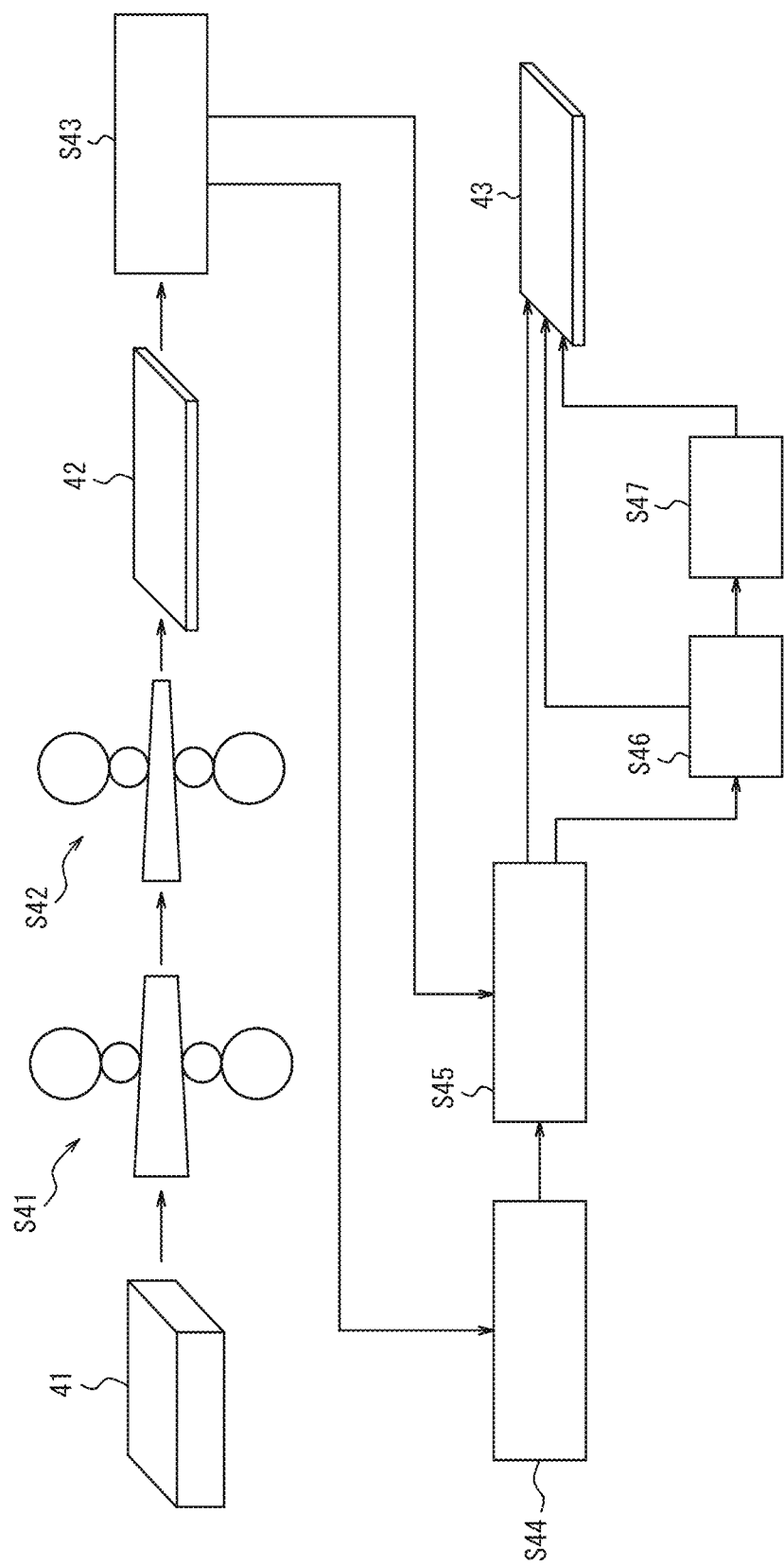
FIG. 10 is a diagram illustrating an example of a steel material manufacturing method.

Example 2 is an example in which the mechanical property measuring method executed by the measuring apparatus 100 was used to inspect the hardness of the surface layer in a steel plate manufacturing method. FIG. 10 illustrates a specific example of the manufacturing method. The method of manufacturing a steel plate 43 illustrated in FIG. 10 includes a rough rolling step S41, a finish rolling step S42, a cooling step S43, a surface layer hardness measurement step S45, a surface layer hardness remeasurement step S46, and a removal step S47. The method may optionally further include a demagnetizing step S44. In the case of adding the demagnetizing step S44, the cooling step S43, the demagnetizing step S44, and the surface layer hardness measurement step S45 are performed in this order.

In the rough rolling step S41, for example, a slab 41 is subjected to rough hot rolling at a temperature of 1000° C. or more. In the finish rolling step S42 which follows, the slab 41 is subjected to finish hot rolling at a temperature of 850° C. or more, to obtain a steel plate 42. In the cooling step S43 which follows, the steel plate 42 is cooled. In the cooling step S43, for example, the steel plate is cooled from a temperature of 800° C. or more to a temperature of about 450° C.

Figure 11:
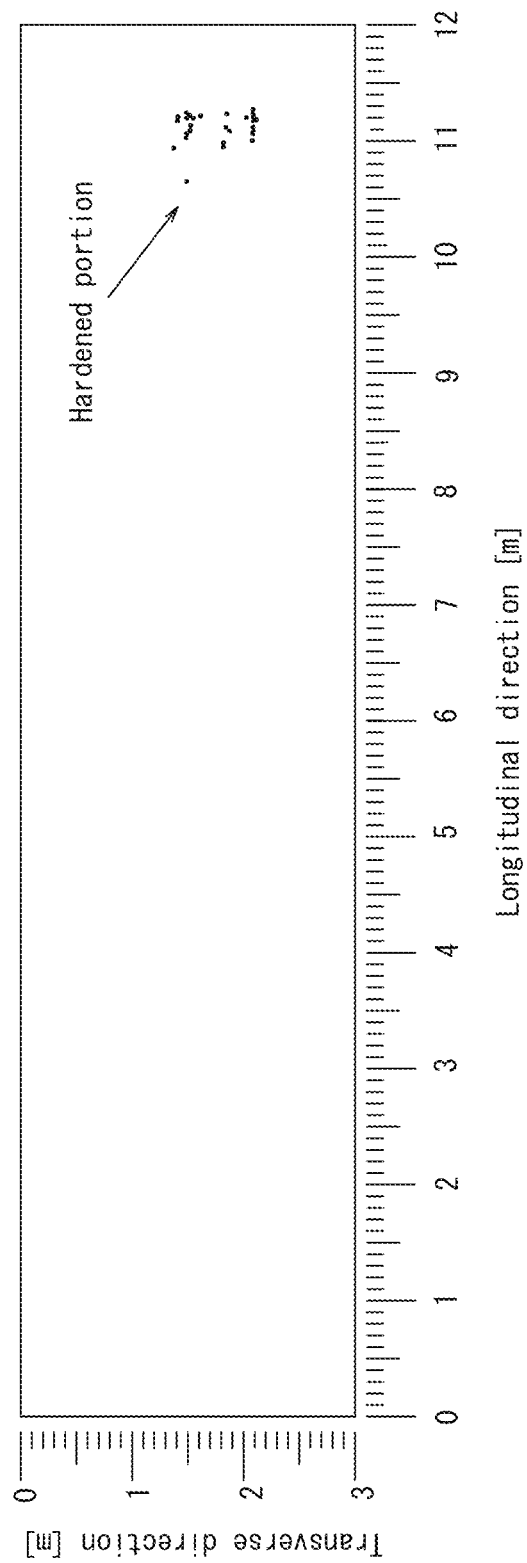
FIG. 11 is a diagram illustrating an example of displaying a determination result on a display.

In the surface layer hardness measurement step S45, the mechanical property of the surface layer is measured for the whole surface of the steel plate 42 after the cooling, using the measurement method executed by the measuring apparatus 100. From the measurement result, each part harder than preset surface layer hardness is determined as a hardened portion. FIG. 11 illustrates an example of displaying a determination result by the display 11. In FIG. 11, each hardened portion where the surface layer hardness exceeds the threshold is two-dimensionally mapped in a specific color (dark gray) in correspondence with the measurement position. The threshold is set to 230 Hv as an example. In FIG. 11, a plurality of hardened portions determined are located near the right end. Such steel plate 42 determined to have hardened portions is sent to the remeasurement step S46.

In the case where the steel plate is lifted using a magnetic force such as a magnet crane, a residual magnetic field remains in the part to which the magnet part of the crane is attracted. When measuring the electromagnetic feature values to measure the mechanical property, if there is a residual magnetic field at least in the surface layer, the mechanical property measurement or evaluation accuracy may decrease. Accordingly, in the case where there is a process that causes generation of a residual magnetic field, it is preferable to add the demagnetizing step S44 immediately before the surface layer hardness measurement step S45 and demagnetize the residual magnetic field in the demagnetizing step S44. In the demagnetizing step S44, a demagnetizing apparatus performs demagnetization using a distance attenuation method so that the residual magnetic field in the surface layer will be 0.5 mT or less.

Figure 15:
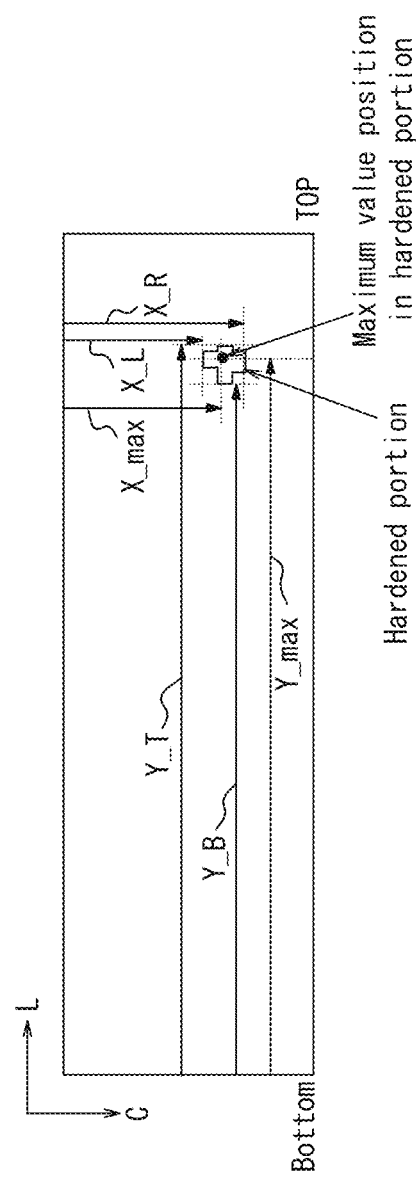
FIG. 15 is a diagram explaining a list of position information of hardened portions.

In the surface layer hardness measurement step S45, for the parts determined as hardened portions, a two-dimensional map and a list of the position information of the detected hardened portions are output. The two-dimensional map and the list of the positional information of the hardened portions are transmitted to a quality management system in the production process, and can be referenced in each process. As the position information of the hardened portions, each detected hardened portion is labeled and collectively assigned an ID as the same defect, as illustrated in FIG. 15. For each ID, the maximum hardness (H_max in the drawing), the average hardness (H_ave), the position in direction L corresponding to the maximum hardness (X_max), and the position in direction C corresponding to the maximum hardness (Y_max), etc. may be output. As the two-dimensional map, a determination result map indicating the hardened portions as illustrated in FIG. 11, a hardness distribution map indicating the hardness in color in the steel plate measurement range, and a model map indicating which model is used may be output. Typically, only the determination result map is used. However, in the case where the detailed hardness distribution is needed such as when making comparison with the production conditions in the cooling step S43, at least one of the hardness distribution map and the model map may be referenced.

In the remeasurement step S46, the surface layer hardness of each hardened portion detected in the surface layer hardness measurement step S45 is remeasured. Here, the mechanical property of the surface layer is remeasured only for the hardened portion and its vicinity, using the measurement method executed by the measuring apparatus 100. In the case where the remeasured surface layer hardness of the hardened portion is again determined to exceed the foregoing threshold, the part is determined to have a locally hard portion, and the steel plate 42 is sent to the removal step S47.

In the removal step S47, the part determined as the hardened portion in the remeasurement step S46 is removed. Specifically, the part determined as the hardened portion is removed by grinding using a known grinding means such as a grinder. After the removal step S47, the production of the steel plate 43 from the steel plate 42 is completed, and the steel plate 43 is sent to other steps (a step of shipment to a customer, a steel pipe or tube manufacturing step, etc.). It is desirable to, for the part of the steel plate 42 ground in the removal step S47, measure the thickness of the steel plate 42 at the grinding position using a known or existing thickness meter, and determine whether it is within a dimensional tolerance set beforehand in the steel plate production. Moreover, it is desirable to, after removing the hardened portion, measure the surface layer hardness for the hardened portion once again using a known contact hardness meter. From this measurement result, whether the surface layer hardness is less than or equal to preset surface layer hardness is determined. If the surface layer hardness is determined to be less than or equal to the preset surface layer hardness, the production of the steel plate 43 from the steel plate 42 is completed.

In the case where it is determined that there is no hardened portion in the surface layer hardness measurement step S45 or in the case where it is determined that the part is not a hardened portion in the remeasurement step S46, the production of the steel plate 43 from the steel plate 42 is completed without performing the removal step S47, and the steel plate 43 is sent to another step (a step of shipment to a customer, a steel pipe or tube manufacturing step, etc.).

The steel plate manufacturing method in this example may further include an annealing step S48 (not illustrated) and the like after the cooling step S43 and before the surface layer hardness measurement step S45. Particularly in the case where the surface layer hardness (more specifically, the Vickers hardness measured from the top surface from which oxide scale has been removed, according to ASTM A 956/A 956MA Standard Test Method for Leeb Hardness Testing of Steel Products) of the steel plate 43 to be manufactured is 230 Hv or more and the steel is of a type that tends to develop warping in the steel plate 43, it is desirable to perform the annealing step S48 after the cooling step S43 and before the surface layer hardness measurement step S45. The annealing step S48 can facilitate microstructure softening by tempering. Since microstructure softening leads to reduction of occurrences of hardened portions, reduction of removal regions can be expected.

In the surface layer hardness measurement step S45, the hardness is measured from the top surface from which oxide scale has been removed according to ASTM A 956/A 956MA Standard Test Method for Leeb hardness Testing of Steel products to determine the hardness, as mentioned above. Here, in rebound hardness measurement, the thickness of the measured object influences the measured value. Hence, the value of the cross-sectional Vickers hardness at a depth of 0.25 mm and the value of the hardness of the surface layer by a rebound hardness meter are studied for each thickness and a relational formula is constructed beforehand. The value of hardness determined as a hardened portion may be adjusted based on the preconstructed relational formula in consideration of the influence of the thickness, with respect to the cross-sectional hardness at a depth of 0.25 mm. Although the reference depth is 0.25 mm in this example, the reference depth is not limited to such.

Although a known grinding means is used as the method of removing the hardened portion in the surface layer of the steel plate 42 determined in the surface layer hardness measurement step S45 in this example, the removal method is not limited to such. Any known method (e.g. heat treatment) that can remove the hardened portion, other than grinding, may be equally used.

In the case where the mechanical property measuring method executed by the measuring apparatus 100 is used in the method of manufacturing the steel plate 43 as in this example, the steel plate 43 which is the substance 1 of high quality can be provided because the mechanical property can be measured accurately through the physical quantities.

More specifically, the steel plate 43 without hardened portions can be manufactured from the steel plate 42.

Embodiment 2

Figure 8:
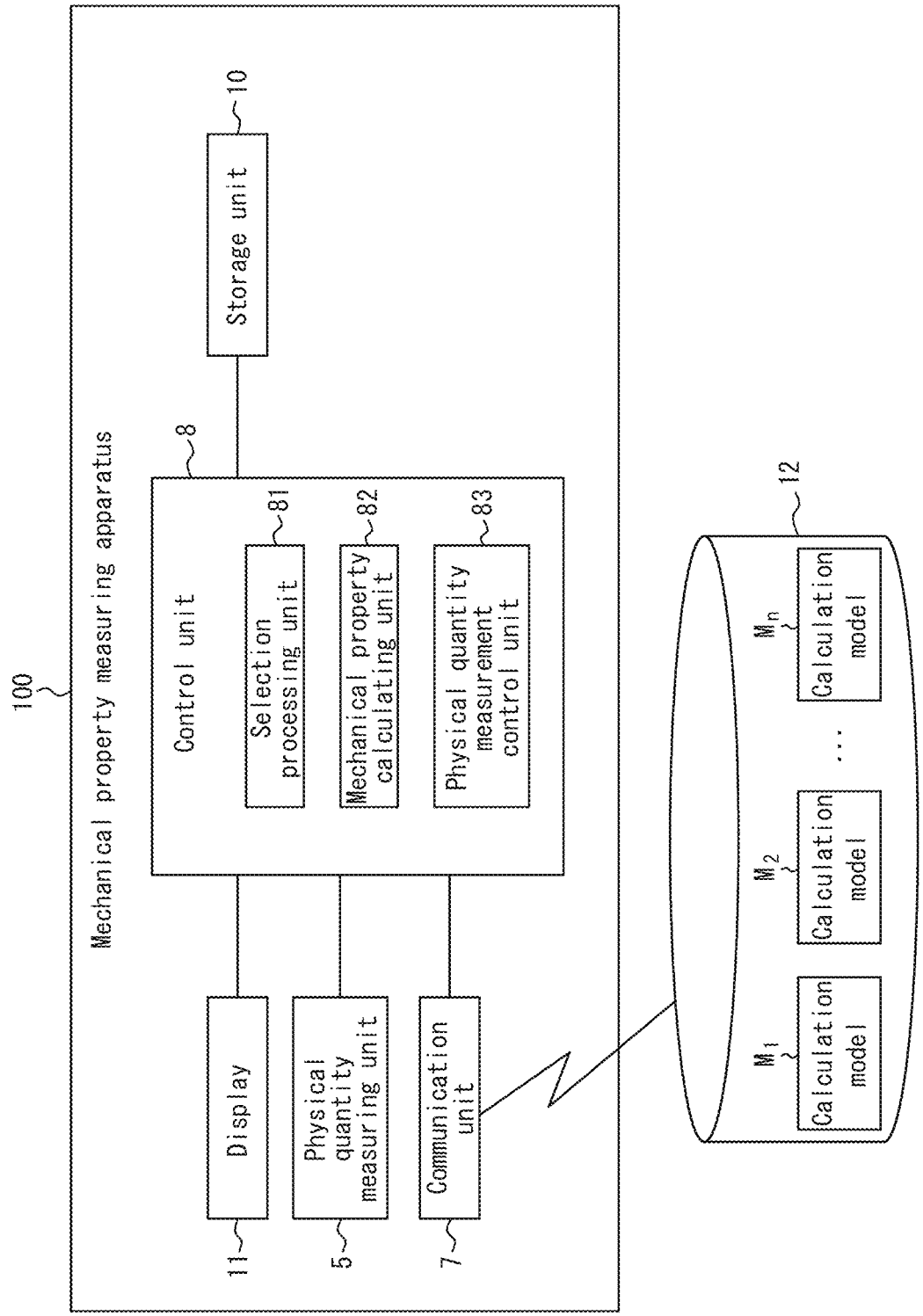
FIG. 8 is a block diagram of a mechanical property measuring apparatus according to another embodiment of the present disclosure.

FIG. 8 is a block diagram of a mechanical property measuring apparatus 100 according to Embodiment 2 of the present disclosure. In Embodiment 1, the plurality of calculation models $M_1, M_2, \ldots, M_n$ are stored in the storage unit 10 included in the measuring apparatus 100. In this embodiment, the plurality of calculation models $M_1, M_2, \ldots, M_n$ are stored in a database 12 outside the measuring apparatus 100. The mechanical property measuring apparatus 100 according to this embodiment includes a communication unit 7. The control unit 8 can access the database 12 via the communication unit 7. In this embodiment, the control unit 8 stores the generated plurality of calculation models $M_1, M_2, \ldots, M_n$ in the database 12 via the communication unit 7. The control unit 8 also acquires the plurality of calculation models $M_1, M_2, \ldots, M_n$ from the database 12 via the communication unit 7. The other structures of the measuring apparatus 100 are the same as those in Embodiment 1.

With the mechanical property measuring apparatus 100, the manufacturing equipment for the substance 1 including the measuring apparatus 100, the mechanical property measuring method executed by the measuring apparatus 100, and the management method and manufacturing method for the substance 1 using the measurement method according to this embodiment, the mechanical property can be measured accurately through the physical quantities as in Embodiment 1. Moreover, since the plurality of calculation models $M_1, M_2, \ldots, M_n$ are stored in the database 12 outside the measuring apparatus 100, the plurality of calculation models $M_1, M_2, \ldots, M_n$ exceeding the storage capacity of the internal storage unit 10 can be handled.

The communication method by the communication unit 7 may be a short-range wireless communication standard, a wireless communication standard connecting to a mobile phone network, or a wired communication standard. Examples of the short-range wireless communication standard include Wi-Fi® (Wi-Fi is a registered trademark in Japan, other countries, or both), Bluetooth® (Bluetooth is a registered trademark in Japan, other countries, or both), infrared, and Near Field Communication (NFC). Examples of the wireless communication standard connecting to a mobile phone network include Long Term Evolution (LTE) and a mobile communication system after 4G. Examples of the communication method used for communication between the communication unit 7 and the physical quantity measuring unit 5 include communication standards such as low power wide area (LPWA) and low power wide area network (LPWAN).

Embodiment 3

Figure 9:
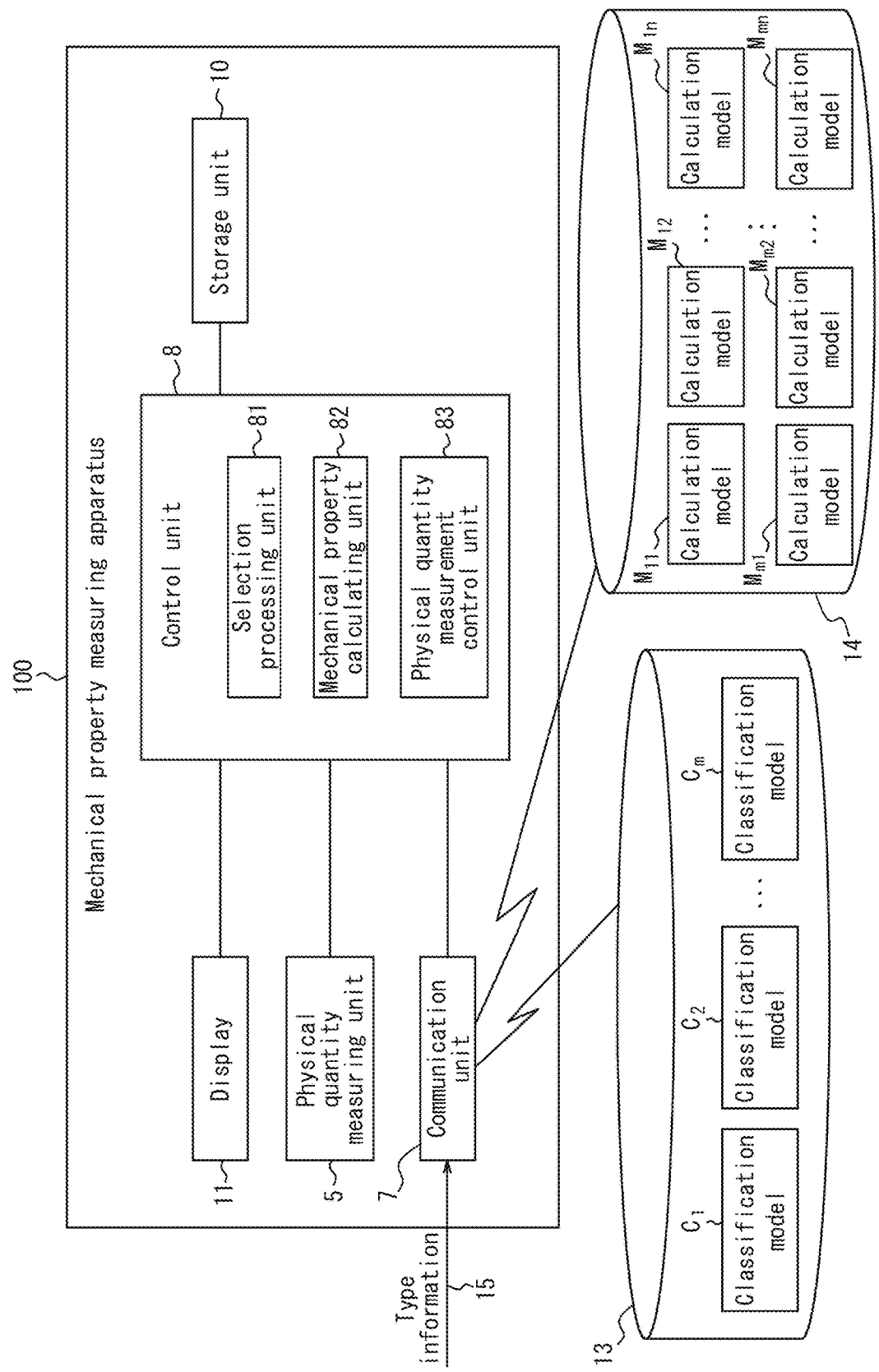
FIG. 9 is a block diagram of a mechanical property measuring apparatus according to another embodiment of the present disclosure.

FIG. 9 is a block diagram of a mechanical property measuring apparatus 100 according to Embodiment 3 of the present disclosure. In Embodiment 1, the plurality of calculation models $M_1, M_2, \ldots, M_n$ are stored in the storage unit 10 included in the measuring apparatus 100. Moreover, in Embodiment 1, the plurality of calculation models $M_1, M_2, \ldots, M_n$ are models corresponding to the measured object 101 of one type. In this embodiment, the measuring apparatus 100 acquires type information 15 via the communication unit 7. The type information 15 is information indicating the type of the substance 1. In this embodiment, the measuring apparatus 100 can support m different types, where m is an integer of 2 or more. If the type is different, for example, the microstructure and the production conditions of the substance 1 are different. Accordingly, a different set of a plurality of calculation models $M_{j1}, M_{j2}, \ldots, M_{jn}$ is prepared for each type of the substance 1, where j is an integer from 1 to m. Further, a group $G_{1i}$ is set in correspondence with a calculation model $M_{1i}$, as mentioned above. Thus, information of the range or boundary of any one set of groups $G_{j1}, G_{j2}, \ldots, G_{1n}$ for the substance 1 is prepared as one selection model $C_j$. The selection model $C_j$ can be, for example, prepared for each type in the case where the substance 1 is a steel material.

The plurality of selection models (classification models) $C_1, C_2, \ldots, C_m$ are stored in a first database 13 outside the measuring apparatus 100. The plurality of calculation models $M_{11}, M_{12}, \ldots, M_{1n}, \ldots, M_{m1}, M_{m2}, \ldots, M_{mn}$ are stored in a second database 14 outside the measuring apparatus 100. The control unit 8 can access the first database 13 and the second database 14 via the communication unit 7. In this embodiment, the control unit 8 stores the generated plurality of selection models $C_1, C_2, \ldots, C_m$ in the first database 13 via the communication unit 7. The control unit 8 stores the generated plurality of calculation models $M_{11}, M_{12}, \ldots, M_{1n}, \ldots, M_{m1}, M_{m2}, \ldots, M_{mn}$ in the second database 14 via the communication unit 7. The control unit 8 also acquires the type information 15 via the communication unit 7. The control unit 8 acquires the selection model $C_j$ corresponding to the type of the substance 1 designated by the type information 15, from the first database 13 via the communication unit 7. The control unit 8 acquires the plurality of calculation models $M_{j1}, M_{j2}, \ldots, M_{jn}$ relating to the designated type from the second database 14 via the communication unit 7. The other structures of the measuring apparatus 100 are the same as those in Embodiment 2.

With the mechanical property measuring apparatus 100, the manufacturing equipment for the substance 1 including the measuring apparatus 100, the mechanical property measuring method executed by the measuring apparatus 100, and the management method and manufacturing method for the substance 1 using the measurement method according to this embodiment, the mechanical property can be measured accurately through the physical quantities as in Embodiment 1. Moreover, since the plurality of selection models $C_1, C_2, \ldots, C_m$ and the plurality of calculation models $M_{11}, M_{12}, \ldots, M_{1n}, \ldots, M_{m1}, M_{m2}, \ldots, M_{mn}$ are stored respectively in the first database 13 and the second database 14 outside the measuring apparatus 100, the models exceeding the storage capacity of the internal storage unit 10 can be handled. Furthermore, the measuring apparatus 100 can support a plurality of types of substances 1, and thus has higher versatility in mechanical property measurement.

While the presently disclosed techniques have been described by way of the drawings and the embodiments, various changes and modifications may be easily made by those of ordinary skill in the art based on the present disclosure. Such changes and modifications are therefore included in the scope of the present disclosure. For example, the functions included in the means, steps, etc. may be rearranged without logical inconsistency, and a plurality of means, steps, etc. may be combined into one means, step, etc. and a means, step, etc. may be divided into a plurality of means, steps, etc.

The structures of the measuring apparatus 100 and the physical quantity measuring unit 5 described in the foregoing embodiments are examples, and all of the components may not necessarily be included. For example, the measuring apparatus 100 may not include the display 11. The measuring apparatus 100 and the physical quantity measuring unit 5 may include other components. For example, there may be a physical distance between the physical quantity measuring unit 5 and each of the control unit 8 and the storage unit 10. In this case, the physical quantity measuring unit 5 and the control unit 8 in the measuring apparatus 100 are electrically connected wiredly or wirelessly. A known technique may be used for the connection.

For example, the presently disclosed techniques can be implemented as programs including processes for achieving the functions of the measuring apparatus 100 or storage media storing such programs, which are also included in the scope of the present disclosure.

For example, although the foregoing embodiments describe the case where the measuring apparatus 100 according to the present disclosure in FIG. 1 is used to collect a learning data set, the present disclosure is not limited to such. The physical quantities of the measured object 101 may be collected using another physical measuring apparatus.

For example, although the foregoing embodiments describe an example in which the measuring apparatus 100 generates the method of distinguishing between the groups $G_1, G_2, \ldots, G_n$, another information processing apparatus may generate the method. In such a case, the other information processing apparatus acquires a learning data set and generates the method of distinguishing between the groups $G_1, G_2, \ldots, G_n$. The other information processing apparatus transmits the generated method of distinguishing between the groups $G_1, G_2, \ldots, G_n$ to the measuring apparatus 100. That is, the method of distinguishing between the groups $G_1, G_2, \ldots, G_n$ generated by the other apparatus is installed in the control unit 8 in the measuring apparatus 100 and used as part of the measuring apparatus 100.

For example, although the foregoing embodiments describe an example in which the measuring apparatus 100 generates the method of distinguishing between the groups $G_1, G_2, \ldots, G_n$, another information processing apparatus may generate the method. In such a case, the other information processing apparatus acquires a separately prepared learning data set and generates the method of distinguishing between the groups $G_1, G_2, \ldots, G_n$. The other information processing apparatus transmits the method of distinguishing between the groups $G_1, G_2, \ldots, G_n$ to the measuring apparatus 100. That is, the method of distinguishing between the groups $G_1, G_2, \ldots, G_n$ generated by the other apparatus is installed in the control unit 8 in the measuring apparatus 100 and used as part of the measuring apparatus 100.

For example, although the foregoing embodiments describe an example in which the measuring apparatus 100 generates the plurality of calculation models $M_1, M_2, \ldots, M_n$, another information processing apparatus may generate the plurality of calculation models $M_1, M_2, \ldots, M_n$. In such a case, the other information processing apparatus acquires a learning data set and generates the plurality of calculation models $M_1, M_2, \ldots, M_n$. The other information processing apparatus transmits the generated plurality of calculation models $M_1, M_2, \ldots, M_n$ to the measuring apparatus 100. That is, the plurality of calculation models $M_1, M_2, \ldots, M_n$ generated by the other apparatus is installed in the control unit 8 in the measuring apparatus 100 and used as part of the measuring apparatus 100.

For example, although the foregoing embodiments describe an example in which the measuring apparatus 100 generates the plurality of calculation models $M_1, M_2, \ldots, M_n$, another information processing apparatus may generate the plurality of calculation models $M_1, M_2, \ldots, M_n$. In such a case, the other information processing apparatus acquires a separately prepared learning data set and generates the plurality of calculation models $M_1, M_2, \ldots, M_n$. The other information processing apparatus transmits the generated plurality of calculation models $M_1, M_2, \ldots, M_n$ to the measuring apparatus 100. That is, the plurality of calculation models $M_1, M_2, \ldots, M_n$ generated by the other apparatus is installed in the control unit 8 in the measuring apparatus 100 and used as part of the measuring apparatus 100.

For example, although the foregoing embodiments describe an example in which the scanning unit 6 scans the sensor 3, the position of the sensor 3 may be fixed. In the case where the position of the sensor 3 is fixed, the scanning unit 6 may move the measured object 101. Although the above describes the case where the scanning unit 6 is a truck moved by human power, the scanning unit 6 may be a truck including a mechanical driving device. The scanning unit 6 may be controlled by a control unit other than the control unit 8 in the measuring apparatus 100 to scan the sensor 3. In particular, in the case where the physical quantity measuring unit 5 according to the present disclosure is installed in the manufacturing equipment for the substance 1, it is preferable to use one or more out of a known scanning device, a new scanning device, a known scanning method, a new scanning method, a known control device, a new control device, a known control method, and a new control method. The control unit of the scanning unit 6 may cooperate with a control unit (not illustrated) in another manufacturing equipment to enable automatic scanning. Conversely, automatic scanning may be enabled by the control unit 8 in the mechanical property measuring apparatus 100. In this case, the scanning unit 6 may be electrically connected to the control unit of the scanning unit, the control unit in the manufacturing equipment, or the control unit 8 in the measuring apparatus 100 wiredly or wirelessly. A known technique may be used for the connection.

For example, in the foregoing embodiments, the user may input determination based on the displayed mechanical property of the substance 1. The user may input, for example, quality determination on the display 11 by touching the touch screen with a finger or the like. The control unit 8 may perform, for example, control of determining whether or not to carry out the grinding step, depending on the quality determination result from the user. Alternatively, the control unit 8 may determine the quality of the substance 1 based on a set threshold instead of the user, to enhance the efficiency in the management step of managing the substance 1.

For example, the selection processing unit 81 may select a plurality of mechanical properties of the substance 1. In such a case, for example, if the acquired physical quantities are in the vicinity of any boundary between the groups $G_1, G_2, \ldots, G_n$, the selection processing unit 81 may select a plurality of mechanical properties relating to the plurality of groups across the boundary. Here, the selection processing unit 81 may calculate the distance between the coordinates of the acquired physical quantities and the boundary line, plane, or hyperplane. In the case where the distance is less than a threshold, the selection processing unit 81 may select the plurality of mechanical properties of the substance 1. In this case, the selection processing unit 81 can further select one of the selected plurality of mechanical properties of the substance 1 as the final mechanical property of the substance 1, according to a predetermined determination condition. As an example, the selection processing unit 81 may select a mechanical property with a greater error from an expected value. In this way, more careful inspection and management can be performed. As another example, the selection processing unit 81 may use a determination criterion that the worst value of the plurality of mechanical properties selected from the groups $G_1, G_2, \ldots, G_n$ is selected as the final mechanical property of the substance 1. In this way, stricter inspection and management can be performed.

Although the foregoing embodiments describe an example in which the substance 1 is a steel material, the physical quantities are electromagnetic feature values, and the mechanical property is hardness, any other combination may be used. For example, the effects according to the present disclosure can be achieved even in the case where the physical quantities are temperatures. For example, the effects according to the present disclosure can be achieved even in the case where the substance 1 is a metal or a compound. The effects can be further enhanced in the case where the film 2 on the surface of the metal or compound has a different feature from the metal or compound with respect to a plurality of physical quantities to be measured. Examples of the metal include iron, steel, nickel, cobalt, aluminum, titanium, and alloys containing one or more thereof. Examples of the compound include inorganic compounds, organic compounds, and compounds containing one or more of iron, steel, nickel, cobalt, aluminum, and titanium. If the substance 1 is iron, steel, nickel, cobalt, an alloy containing one or more thereof, or a compound containing one or more thereof, the effects according to the present disclosure can be achieved more clearly in the case of using electromagnetic feature values as the plurality of physical quantities. In particular, in the case where the substance 1 is a steel material, its mechanical property is determined by the ratio of alloying elements contained in the steel material and the methods of quenching and annealing treatments. Accordingly, at least one of the surface temperatures before and after the quenching treatment and before and after the annealing treatment may be used as a physical quantity to be measured.

APPLICATION EXAMPLES

The mechanical property measuring apparatus 100 configured as described above and the mechanical property measuring method executed by the measuring apparatus 100 are suitable for use in, for example, the following lines or situations.

The presently disclosed techniques may be applied as part of an inspection equipment included in a manufacturing equipment for the substance 1. In detail, the mechanical property measuring apparatus 100 according to the present disclosure may be used to measure the surface of the substance 1 manufactured in a known, new, or existing manufacturing equipment together with the film 2 on the surface of the substance 1. From the measurement result and, for example, a preset mechanical property, the inspection equipment may inspect the mechanical property of the substance 1. In other words, the mechanical property measuring apparatus 100 according to the present disclosure measures the substance 1 manufactured by the manufacturing equipment. The inspection equipment including the mechanical property measuring apparatus 100 according to the present disclosure inspects the substance 1 manufactured by the manufacturing equipment, using the preset mechanical property as an example.

The presently disclosed techniques may be applied as part of an inspection step included in a manufacturing method for the substance 1. Specifically, the substance 1 manufactured in a known, new, or existing manufacturing step may be inspected in the inspection step in a state in which the surface of the substance 1 has the film 2 formed thereon. The inspection step includes the foregoing measurement step, calculation step, and selection step according to the present disclosure, and outputs the mechanical property of the substance 1 having the film 2 on its surface as the measured object 101. Alternatively, the inspection step calculates the mechanical property of the substance 1 having the film 2 on its surface as the measured object 101, using the mechanical property measuring apparatus 100 according to the present disclosure. More preferably, the manufacturing method may include a condition change step of, in the case where the mechanical property of the substance 1 selected by the selection step or the measuring apparatus 100 is outside a reference range, changing the production conditions in the manufacturing step so that the mechanical property will be within the reference range. The reference range herein may be a standard range of the mechanical property statistically obtained using substances 1 manufactured in the past. The production conditions are parameters adjustable in the manufacturing step of the substance 1. Examples of the production conditions include the heating temperature, the heating time, and the cooling time of the substance 1.

With the manufacturing equipment for the substance 1 and the manufacturing method for the substance 1, the mechanical property can be measured accurately through the physical quantities, so that the substance 1 can be manufactured at a high yield rate. In the case where the mechanical property of the substance 1 obtained by the mechanical property measuring apparatus 100 or the selection step is the mechanical property of the surface layer of the substance 1, a more appropriate calculation model can be generated and selected by the selection processing unit 81 or the selection step (step S13), so that the foregoing effects can be further enhanced.

An example of a manufacturing equipment for the substance 1 is as follows:

A steel plate manufacturing equipment comprising:
  a rolling equipment configured to roll a slab to obtain a steel plate;
  an inspection equipment including a mechanical property measuring apparatus according to the present disclosure, and configured to measure surface layer hardness of the steel plate by the measuring apparatus and determine, from the measured surface layer hardness of the steel plate, a part in a surface layer of the steel plate harder than preset surface layer hardness as a hardened portion; and
  a removal equipment configured to remove the determined hardened portion in the surface layer of the steel plate.

More preferably, the manufacturing equipment optionally further comprises a demagnetization equipment configured to demagnetize the surface layer of the steel plate or the whole steel plate, between the rolling equipment and the inspection line. In this way, a decrease in mechanical property measurement or evaluation accuracy can be prevented.

An example of a manufacturing method for the substance 1 is as follows:

A steel plate manufacturing method comprising:
  a rolling step of rolling a slab to obtain a steel plate;
  an inspection step of measuring surface layer hardness of the steel plate by a mechanical property measuring method according to the present disclosure, and determining, from the measured surface layer hardness of the steel plate, a part in a surface layer of the steel plate harder than preset surface layer hardness as a hardened portion; and a removal step of removing the determined hardened portion in the surface layer of the steel plate.

More preferably, the manufacturing method optionally further comprises a demagnetizing step of demagnetizing the surface layer of the steel plate or the whole steel plate, between the rolling step and the inspection step. In this way, a decrease in mechanical property measurement or evaluation accuracy can be prevented.

In the foregoing steel plate manufacturing method, the rolling step is performed on the continuous slab at 850° C. or more in order to obtain a predetermined shape and mechanical property. After the rolling step, quenching and annealing may be performed as a heat treatment step. It is well known that electromagnetic feature values such as incremental magnetic permeability, coercive force, and Barkhausen noise correlate with the mechanical property of a steel material. It is therefore preferable to measure the electromagnetic feature values as the physical quantities of the measured object 101 in a state in which the microstructure of the steel material has been established through the heat treatment step. Here, the measured object 101 denotes the steel plate and a film on the surface of the steel plate. Examples of the film on the surface of the steel plate include iron oxide films such as scale and mill scale, organic coatings such as resin coating, plating films, and chemical conversion coatings. Given that the mechanical property is determined by quenching and annealing, the temperatures before and after the quenching, the temperatures before and after the annealing, etc. may be further measured and used as physical quantities of the measured object 101 in the manufacturing method.

The presently disclosed techniques may be applied to a management method for the substance 1, to inspect and thus manage the substance 1. Specifically, the substance 1 having the film 2 on its surface and prepared beforehand is inspected in an inspection step, and managed in a management step of classifying the substance 1 based on the inspection result in the inspection step. The inspection step includes the foregoing measurement step, calculation step, and selection step according to the present disclosure, and outputs the mechanical property of the substance 1 having the film 2 on its surface and prepared beforehand as the measured object 101. Alternatively, the inspection step outputs the mechanical property of the substance 1 having the film 2 on its surface as the measured object 101, using the mechanical property measuring apparatus according to the present disclosure. In the management step which follows, the substance 1 can be managed. In the management step, the manufactured substance 1 is classified according to a criterion designated beforehand based on the mechanical property of the substance 1 obtained by the selection step or the mechanical property measuring apparatus 100, and thus managed. For example, in the case where the substance 1 is a steel material and the mechanical property of the substance 1 is the hardness of the steel material, the steel material can be classified into a class corresponding to the hardness. With such management method for the substance 1, the mechanical property can be measured accurately through the physical quantities, so that the substance 1 of high quality can be provided. In the case where the mechanical property of the substance 1 obtained by the mechanical property measuring apparatus 100 or the calculation step is the mechanical property of the surface layer of the substance 1, a more appropriate calculation model can be generated and selected by the selection processing unit 81 or the selection step (step S13), so that the foregoing effects can be further enhanced.

An example of a management method for the substance 1 is as follows:

A steel plate manufacturing method comprising:

an inspection step of measuring surface layer hardness of a steel plate by a mechanical property measuring method according to the present disclosure, and determining, from the measured surface layer hardness of the steel plate, a part in a surface layer of the steel plate harder than preset surface layer hardness as a hardened portion; and a management step of classifying the steel plate by an area and/or a position of the determined hardened portion in the surface layer of the steel plate.

REFERENCE SIGNS LIST 1 substance
2 film
3 sensor
5 physical quantity measuring unit
6 scanning unit
7 communication unit
8 control unit
10 storage unit
11 display
12 database
13 first database
14 second database
15 type information
31 excitation coil
32 magnetizing yoke
41 slab
42 steel plate
43 steel plate (without hardened portions)
81 selection processing unit
82 mechanical property calculating unit
83 physical quantity measurement control unit
100 measuring apparatus
101 measured object

The invention claimed is:

1. A mechanical property measurement device comprising:

a physical quantity measurement unit configured to measure a plurality of physical quantities of a measurement object that includes a substance and a film on a surface of the substance;

a mechanical property calculator configured to calculate, using a plurality of calculation models each for calculating a mechanical property of the substance and at least two of the plurality of physical quantities measured, the mechanical property of the substance for each of the plurality of calculation models; and a selection processor configured to select, as the mechanical property of the substance, one mechanical property out of a plurality of mechanical properties of the substance calculated, based on the at least two of the plurality of physical quantities.

2. The mechanical property measurement device according to claim 1, wherein the plurality of physical quantities include a current waveform distortion amount, a current waveform amplitude, a harmonic amplitude, magnetic permeability, and a coercive force as electromagnetic feature values, the mechanical property calculator is configured to calculate the mechanical property of the substance for each of the plurality of calculation models, using the plurality of calculation models and at least two of the electromagnetic feature values, and the selection processor is configured to select the one mechanical property, based on the at least two of the electromagnetic feature values.

3. A mechanical property measurement method comprising:

measuring a plurality of physical quantities of a measurement object that includes a substance and a film on a surface of the substance;

calculating, using a plurality of calculation models each for calculating a mechanical property of the substance and at least two of the plurality of physical quantities measured, the mechanical property of the substance for each of the plurality of calculation models; and selecting, as the mechanical property of the substance, one mechanical property out of a plurality of mechanical properties of the substance calculated, based on the at least two of the plurality of physical quantities.

4. A substance manufacturing equipment comprising:

a manufacturing equipment configured to manufacture a substance; and a mechanical property measurement device, wherein the mechanical property measurement device includes:

a physical quantity measurement unit configured to measure a plurality of physical quantities of a measurement object that includes the substance and a film on a surface of the substance;

a mechanical property calculator configured to calculate, using a plurality of calculation models each for calculating a mechanical property of the substance and at least two of the plurality of physical quantities measured, the mechanical property of the substance for each of the plurality of calculation models; and a selection processor configured to select, as the mechanical property of the substance, one mechanical property out of a plurality of mechanical properties of the substance calculated, based on the at least two of the plurality of physical quantities, and the mechanical property measurement device is configured to measure the mechanical property of the substance manufactured by the manufacturing equipment.

5. The substance manufacturing equipment according to claim 4, wherein the plurality of physical quantities include a current waveform distortion amount, a current waveform amplitude, a harmonic amplitude, magnetic permeability, and a coercive force as electromagnetic feature values, the mechanical property calculator is configured to calculate the mechanical property of the substance for each of the plurality of calculation models, using the plurality of calculation models and at least two of the electromagnetic feature values, and the selection processor is configured to select the one mechanical property, based on the at least two of the electromagnetic feature values.

6. A substance management method comprising:

measuring a plurality of physical quantities of a measurement object that includes a substance and a film on a surface of the substance;

calculating, using a plurality of calculation models each for calculating a mechanical property of the substance and at least two of the plurality of physical quantities measured, the mechanical property of the substance for each of the plurality of calculation models;

selecting, as the mechanical property of the substance, one mechanical property out of a plurality of mechanical properties of the substance calculated, based on the at least two of the plurality of physical quantities; and classifying the substance based on the selected mechanical property of the substance.

7. A substance manufacturing method comprising:

a manufacturing step of manufacturing a substance;

measuring a plurality of physical quantities of a measurement object that includes the substance manufactured and a film on a surface of the substance;

calculating, using a plurality of calculation models each for calculating a mechanical property of the substance and at least two of the plurality of physical quantities measured, the mechanical property of the substance for each of the plurality of calculation models; and selecting, as the mechanical property of the substance, one mechanical property out of a plurality of mechanical properties of the substance calculated, based on the at least two of the plurality of physical quantities.

* * * * *